United States Patent
Kadota et al.

(10) Patent No.: US 8,377,345 B2
(45) Date of Patent: *Feb. 19, 2013

(54) METHOD OF MANUFACTURING OPTICAL MEMBER, METHOD OF MANUFACTURING PLASTIC LENS, GASKET FOR MOLDING PLASTIC LENS, AND JOG FOR CASTING MONOMER

(75) Inventors: Masanori Kadota, Tokyo (JP); Shigeo Nakamura, Tokyo (JP); Kengo Hirayama, Bangkok (TH); Yoshitaka Kitahara, Tokyo (JP); Yuji Hoshi, Tokyo (JP); Yasuhisa Okamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,673

(22) Filed: Jan. 27, 2010

(65) Prior Publication Data

US 2010/0127411 A1    May 27, 2010

Related U.S. Application Data

(62) Division of application No. 10/509,671, filed as application No. PCT/JP03/04448 on Apr. 8, 2003, now Pat. No. 7,682,531.

(30) Foreign Application Priority Data

| Apr. 8, 2002 | (JP) | 2002-105180 |
| Apr. 15, 2002 | (JP) | 2002-111441 |
| Feb. 10, 2003 | (JP) | 2003-031857 |

(51) Int. Cl.
*B29D 11/00* (2006.01)

(52) U.S. Cl. .......... 264/1.1; 264/2.6; 264/102; 425/197; 425/808

(58) Field of Classification Search .............. 264/1.1, 264/2.6, 101, 102, 299, 169, 236; 425/197, 425/808
See application file for complete search history.

(56) References Cited

U.S. PATENT DOCUMENTS

| 4,693,446 A | 9/1987 | Orlosky |
| 5,962,617 A | 10/1999 | Slagel |
| 6,127,505 A | 10/2000 | Slagel |
| 2002/0163095 A1 | 11/2002 | Andino et al. |

FOREIGN PATENT DOCUMENTS

| EP | 657896 | * 6/1995 |
| JP | 05-212732 | 8/1993 |
| JP | 6-39951 | 10/1994 |
| JP | 7-29320 | 4/1995 |
| JP | 2003-103586 | 4/2003 |

(Continued)

OTHER PUBLICATIONS

"Megane", published by Medical Aoi, pp. 83-86 1991.

(Continued)

*Primary Examiner* — Mathieu D. Vargot
(74) *Attorney, Agent, or Firm* — Oblon, Spivak, McClelland, Maier & Neustadt, L.L.P.

(57) ABSTRACT

A method of manufacturing an optical member by mixing isocyanate terminal prepolymer component (A) and aromatic diamine component (B), and immediately after mixing, casting a mixture into a casting mold to obtain a molded article. A method of manufacturing a plastic lens by mixing said components (A) and (B), immediately after mixing, casting a mixture into a casting mold and polymerizing it to obtain a molded article. A gasket for molding plastic lenses comprised of a cylindrical member. A casting mold for molding plastic lenses using this gasket and a monomer casting jig.

10 Claims, 12 Drawing Sheets

FOREIGN PATENT DOCUMENTS

WO 01 32407 5/2001

OTHER PUBLICATIONS

Nylon, http://en.wikipedia.org/wiki/Nylon 5 pp. accessed Oct. 4, 2011.

Teflon, http://www.thefreedictionary.com/Teflon 2 pp. accessed Oct. 4, 2011.

Teflon, http://www2.dupont.com/Teflon/en_US/products/safety/what_is_it.html 2 pp. accessed Oct. 4, 2011.

* cited by examiner

METHOD OF MANUFACTURING OPTICAL MEMBER, METHOD OF MANUFACTURING PLASTIC LENS, GASKET FOR MOLDING PLASTIC LENS, AND JOG FOR CASTING MONOMER

CROSS-REFERENCE TO RELATED APPLICATIONS

This application is a divisional of and claims benefit of priority from U.S. application Ser. No. 10/509,671, filed May 16, 2005, now U.S. Pat. No. 7,682,531, the entire contents of which are hereby incorporated by reference. U.S. application Ser. No. 10/509,671 is a national stage of PCT/JP2003/04448 filed Apr. 8, 2003 and further is based upon and claims benefit of priority from the prior Japanese Application Nos. 2002-105180, filed Apr. 8, 2002; 2002-111441, filed Apr. 15, 2002; and 2003-031857, filed Feb. 10, 2003.

TECHNICAL FILED

The present invention relates to a method of manufacturing an optical member such as a plastic lens by mixing component (A), an isocyatnate terminal prepolymer, and component (B), an aromatic diamine, that react immediately after mixing, and cast-polymerizing them in a casting mold.

The present invention further relates to a method of manufacturing an optical member comprising the step of removing foreign matter contained in the aforementioned component (A).

Since the optical member obtained by the manufacturing method of the present invention is of higher strength than other urethane resins and the starting material prepolymer is free of even minute foreign matter, it is advantageously employed as a member required impact resistance and transparency, such as automotive window glass, airplane window glass, eyeglass lenses, and protective lenses.

The present invention further relates to a gasket for molding plastic lenses, a casting mold employing this gasket, and a jig for casting starting material monomer into a casting mold.

TECHNICAL BACKGROUND

The technique of obtaining a high-strength, transparent molded article by mixing an isocyanate terminal prepolymer component (A) and an aromatic diamine component (B) mentioned above is described in U.S. Pat. No. 6,127,505.

The reaction of components (A) and (B) is one of the fastest among many molding reactions of urethane and derivatives thereof. Accordingly, a reaction injection molding ("RIM" hereinafter) machine is generally employed. In the mixing step, two solutions are thoroughly mixed in a mixer. They are then immediately cast into a casting mold, where they are cast-polymerized to obtain a molded article.

The configuration of a common RIM machine is shown in FIG. 18. The method of manufacturing a molded article using this machine will be described.

Here, components (A) and (B) are stored under a reduced pressure in material tanks 11A and 11B and thoroughly degassed. When degassing is inadequate, bubbles mix into the molded article, sometimes compromising the properties and appearance of the final product and sometimes reducing the mechanical strength of the molded article. Further, since component (A) is of high viscosity at an ordinary temperature, heating is used to reduce this viscosity when the efficiency of degassing is affected or molding is precluded. The two liquids are mixed and discharged once materials in the tanks have been thoroughly degassed and rendered uniform in temperature. In this process, the materials are forced from the tank through 13A and 13B by pumps 12A and 12B, pass through filters 14A and 14B, and arrive in mixing and discharging part. In mixing and discharging part 15, components (A) and (B) are mixed either by shafts rotating at high speed or by a static mixer to obtain a uniformly mixed solution of the two liquids, and the mixed solution is discharged.

Components (A) and (B) react very rapidly, requiring only several tens of seconds to several minutes to form a gel. Thus, when foreign matter is present in one or both components, it is extremely difficult to use a filter device to remove the foreign matter in a post-mixing step. This is not only because the filter device solidifies and ceases to function, but also because the control function of the mold pump is affected. Accordingly, when removing foreign matter from the components, it is necessary to position filter devices between mixing and discharging part 15 and pumps —12A and 12B. Further, to maintain a constant mixing ratio of components (A) and (B) and achieve molded articles of constant quality, the level (rate) at which components (A) and (B) are discharged to mixing and discharging part 15 must be stabilized to the extent possible. Thus, it suffices to position the filter devices as far as possible from mixing and discharging part 15. This permits stabilization of the unstable flow of the individual components following mixing.

For such reasons, filters 14A and 14B have been conventionally mounted near the positions indicated in FIG. 18 within the RIM machine, as stated above.

Filters having an absolute filtration precision of about 100 μm have generally been mounted in the RIM machine. However, when manufacturing optical members such as eyewear lenses, this level of filtration precision does not permit good removal of the minute foreign matter that tends to reduce molded article transmittance, optical properties, and mechanical strength.

The minute foreign matter causing these problems is comprised particularly of impurities of 10 μm or less. These impurities are difficult to remove without precision filtration with a filter of an absolute filtration precision of less than or equal to 10 μm.

Accordingly, it is conceivable to increase the filtration precision of the filter provided in the RIM machine. However, the filtering capability of the filter provided in the RIM machine greatly affects the discharge level of each component. Thus, when the filtration precision of the filter becomes excessively high, it may be impossible for the discharge level of each component to achieve the targeted discharge level. In particular, component (A) is of high viscosity and is difficult to filter at an ordinary temperature, and must therefore be heated to lower its viscosity. However, deterioration of component (A) due to heating, the heat resistance of the casting mold, and properties relating to ease of handling by the operator in the step of filling the casting mold and subsequent steps must also be considered. Further, the higher the mixing temperature of components (A) and (B), the faster the polymerization reaction. Thus, bubbles and optical defects tend to form in the molded article, limiting heating of component (A). Since the viscosity cannot be adequately lowered for this reason, the filtration rate of component (A) is slow. Additionally, although component (B) is of low viscosity, it must be mixed with component (A) in a prescribed ratio, so the level of mixed solution being discharged decreases.

Accordingly, it is conceivable to increase the volume (filtration surface area) of the filter used to filter component (A) to reduce the pressure loss exerted on the filter and ensure the targeted discharge level. However, since the mesh of the filter is fine and tends to clog, the filter maintenance interval becomes short. Further, after replacing the filter, bubbles mix into component (A) until the air within the filter is replaced by component (A). Thus, it is necessary to continuously pass component (A) through the filter until the bubbles disappear. When the filter area is large, a long period is required for the bubbles to disappear. There is thus a problem in that the RIM machine can only operate continuously for a short period.

Accordingly, the first object of the present invention is to provide a method of manufacturing optical members having good optical and mechanical characteristics, in particular, by removing, from component (A), not only foreign matter and debris, but also minute foreign matter tending to reduce the transmittance, optical properties, and mechanical strength of molded articles, without affecting the level of discharge of each component in an RIM machine.

Cast polymerization methods are known methods of molding plastic lenses. For example, *Megane* (published May 22, 1986 by Medical Aoi) discloses a manufacturing process for diethylene glycol bisallyl carbonate lenses (CR-39 lenses). This lens manufacturing process describes a casting mold in which a gap is maintained between the upper mold and lower mold of a glass master mold by means of a cylindrical gasket to form a cavity. A lens starting material liquid (referred to hereinafter as "monomer") is cast into this cavity. Following casting, the mold is placed in an electric furnace and heated to conduct polymerization. The fully polymerized lens is then removed from the mold.

A monomer can be cast into a cavity through a casting inlet formed in a gasket. For example, Japanese Utility Model Publication (JIKKO) Heisei No. 6-39951 describes such a gasket. In the gasket disclosed therein, a ring-shaped protruding strip is provided in a circumferential direction along the surface of the inside wall of a cylindrical gasket main body. A portion of this protruding strip is cut away to form a notch part. A casting inlet is formed on the outer circumferential surface of the gasket main body adjacent to the notch part. The notch part and the casting inlet communicate through a casting hole formed in the gasket main body.

A cavity is formed in the gasket while maintaining an upper mold and a lower mold in a state of contact with the protruding strip.

This gasket is comprised of an elastic resin and integrally formed.

A mixed monomer solution is cast into the casting mold in which the gasket is employed by casting the monomer fluidly under the effect of its own weight through the casting inlet part with the gasket in a tilted position so that the casting inlet of the casting inlet part faces upward.

However, in the gasket disclosed in above-cited Japanese Utility Model Publication (JIKKO) Heisei No. 6-39951, there is a problem in that a penetrating hole is formed from the outer wall surface to the inner wall surface of the gasket main body as a casting hole, increasing the cost of manufacturing the injection mold. This is because the configuration of the injection mold generally becomes quite complex when using injection molding to integrally mold plastic molded articles having holes, for example.

Further, when casting a monomer from above as is the case with this gasket, bubbles are sometimes involved during casting, depending on the casting conditions and materials. When the viscosity of the monomer is low, there are few problems because the bubbles are relatively easily removed. However, when employing a high viscosity monomer or a monomer with a high initial polymerization rate, the removal of bubbles is difficult. A gasket of such configuration cannot be utilized when employing such starting materials.

U.S. Pat. No. 6,127,505 discloses a polymerization starting material of high viscosity and high initial polymerization rate. This starting material is comprised of an isocyanate terminal prepolymer having intramolecular urethane bonds and an aromatic diamine. The former prepolymer is of high molecular weight and high viscosity, and both are characterized by undergoing a rapid polymerization reaction immediately after being mixed with each other. Molded articles obtained by the method disclosed in U.S. Pat. No. 6,127,505 are of a high strength, comparable with that of polycarbonates.

To mold lenses using the materials disclosed in the above-cited U.S. Pat. No. 6,127,505, it is desirable to employ a reaction injection molding technique, rapidly mix the materials, and cast the materials into a casting mold immediately following mixing.

Of the materials disclosed in the publication, the aforementioned prepolymer has a high viscosity. Therefore, when bubbles are produced within the cavity, removal of the bubbles is difficult. That is, when casting the mixed solution from above the casting mold, air is involved in the mixed solution, forming bubbles. Due to the high viscosity, the bubbles that are formed tend not to rise upward, remaining within the molded article. Further, since the disclosed material begins to polymerize immediately following mixing at a rapid rate of polymerization, the viscosity tends to rise following casting, rendering the removal of bubbles all the more difficult.

Since immediately after mixing, the disclosed material begins polymerizing rapidly at a fast rate of polymerization, optical defects tend to form in the lens that is molded. That is, when the mixed solution is poured in from above the casting mold, flow occurred between the mixed solution cast in first and that cast in later is relatively active. Thus, marks like flows at that time and marks produced by uneven polymerization tend to be produced, sometimes becoming optical defects. Further, when the casting mold is subjected to vibration or shock shortly after casting the material, the mixed solution undergoing polymerization moves about within the cavity, with the resulting marks sometimes becoming optical defects.

For these reasons, there is a need for a method of molding in which bubbles and optical defects tend not to form in the molded article.

In molding methods employing the gasket disclosed in Japanese Utility Model Publication (JIKKO) Heisei No. 6-39951, the gasket is removed following polymerization from a casting mold that has been filled with starting material. In that process, it is necessary to sever, in the vicinity of the casting hole, the portion that has polymerized within the monomer casting inlet and remove it from the molded article. When employing a gasket such as that described in Japanese Utility Model Publication (JIKKO) Heisei No. 6-39951, the portion that has polymerized in the vicinity of the casting hole is usually broken by bending the casting inlet, and the gasket is removed.

However, the material disclosed in U.S. Pat. No. 6,127,505 is quite strong, as stated above, and thus not readily broken. Further, it is of high viscosity, so that when the casting hole is widened to facilitate casting, the strength of this portion becomes even greater and breaking becomes even more difficult. Thus, there is a need for a molding method permitting the ready removal of the gasket.

Japanese Examined Patent Publication (KOKOKU) Heisei No. 7-29320 discloses a molding method in which no air is involved within the casting mold in reaction injection molding. In this method, the casting inlet of the reaction solution mixture is positioned beneath the casting mold and an air discharge outlet is provided in the portion of the casting mold that is filled last. It is disclosed that introducing the reaction solution mixture from below permits the obtaining of a molded article free of bubbles that is attractive in appearance.

However, until now, there has been no gasket suited to the cast molding of plastic lenses by introducing from below a reactive monomer of relatively high viscosity such as that set forth above. Further, since the above monomer reacts rapidly and cures immediately, overflowing of the material from the casting mold to the exterior may create operational problems.

Accordingly, the second object of the present invention is to provide a molding method suited to the molding of plastic lenses from a mixed solution of an isocyanate terminal prepolymer component (A) that is the reaction product of an aliphatic diisocyanate having an intramolecular cyclic structure and a diol having an average molecular weight of 300 to 2,500, and an aromatic diamine component (B); and more particularly, to provide a method of manufacturing a polymeric molded article free of bubbles and optical defects achieved by improving the method of casting the mixed solution into the casting mold, and a method of readily removing a gasket following molding achieved by improving the molding method.

The third object of the present invention is to provide a gasket that is suited to the cast molding of plastic lenses by casting from below a monomer of viscosity and reactivity such as set forth above, and in which the casting inlet structure is a non-hole structure that is capable of being readily molded while tending not to cause starting material monomer to overflow to the exterior of the casting mold; a casting mold employing the aforementioned gasket; and a monomer casting jig suited to the casting of starting material monomer into the casting mold.

DISCLOSURE OF THE INVENTION

The present inventors conducted extensive research for achieving the above-stated first object, resulting in the discovery that by subjecting component (A) to specified precision filtration prior to feeding it to a RIM machine and transferring it to the RIM machine, it was possible to obtain an optical member without affecting the discharge level within the RIM machine; the present invention was devised on this basis.

That is, the first aspect of the present invention for achieving the first object mentioned above is as follows:

One embodiment is a method of manufacturing an optical member by mixing the following components (A) and (B), and immediately after mixing, casting a mixture into a casting mold to obtain a molded article, characterized in that said component (A) is heated to a viscosity of 5000 CPS or less, the heated component (A) is passed through a filter while being pressurized to remove foreign matter comprised in component (A), subsequently degassed under a reduced pressure, and then subjected to said mixing.

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each dependently any of a methyl, ethyl or thiomethyl group.)

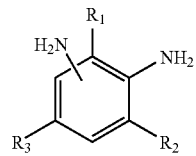

General formula (I)

In another embodiment, the aliphatic diisocyanate having an intramolecular cyclic structure, that is a starting material of (A), is an alicyclic diisocyanate.

In another embodiment, the alicyclic diisocyanate is at least one selected from the group consisting of 4,4'-methylenebis(cyclohexyl isocyanate), isophorone diisocyanate, 1,3-bis(isocyanate methyl)cyclohexane and norbornene diisocyanate.

In a different embodiment, the diol having an average molecular weight of 300-2,500, that is a starting material of component (A), is a polyether diol or polyester diol.

In a different embodiment, the isocyanate group content of componnent (A) ranges from 10 to 20 weight percent.

In another embodiment, said mixing and casting into the casting mold are carried out in a reaction injection molding machine, and said removal of foreign matter is carried out prior to feeding to the reaction injection molding machine.

In another embodiment, said filter has an absolute filtration precision ranging from 0.05 to 10 μm.

In a different embodiment, a filter member of the filter is one selected from the group consisting of Teflon difluoride (PTFE), Teflon tetrafluoride (PTFE), polypropylene (PP), polyvinylidene fluoride (PVDF), polyphenylene sulfide (PPS), cellulose, Nylon 66, 304 stainless steel, and 316 stainless steel.

In a different embodiment, said molded article is a plastic lens.

The second aspect of the present invention for achieving the second object mentioned above is as follows:

One embodiment is a method of manufacturing a plastic lens by mixingthe following components (A) and (B), immediately after mixing, casting a mixture into acasting mold and polymerizing it to obtain a molded article, wherein the mixing of the following components (A) and (B) is carried out after heating saidcomponent (A) to reduce its viscosity, said casting mold has a mold for forming one side of the lens and a mold for formingthe other side thereof that are positioned opposite at a prescribed interval, a circular gasket ispositioned around said two molds, and a cavity is formed by said molds and gasket, saidgasket has a casting hole for casting a mixture of said components (A) and (B) into saidcavity and a discharge hole for discharging gas and said mixture in said cavity to an exteriorof the casting mold, that are positioned opposite in a diameter direction, said casting into the casting mold is carried out in a state that said casting mold istilted from or perpendicular to a horizontal plane as well as said discharge hole is positionedat a top.

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (Ingeneral formula (I), $R_1$, $R_2$ and $R_3$ are each dependently any of a methyl, ethyl or thiomethyl group.)

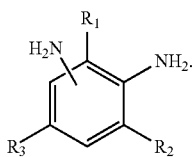

In another embodiment, the casting mold is preheated prior to casting of said mixture.

In a different embodiment, casting of said mixture into said casting mold is carried out through a tube, one end of which is mounted in a detachable manner to a discharge outlet provided in a mixing chamber in which the following components (A) and (B) are mixed, and the other end of which is connected to said casting hole of the casting mold.

In another embodiment, in the method of manufacturing to said gasket is provided with a casting inlet having an indentation communicating with said cavity through said casting hole and a discharge outlet having an indentation communicating with said cavity through said discharge hole, the casting mold in which said mixture has been cast is left in a low-temperature atmosphere to polymerize said mixture, subsequently a polymerized portion within the cavity is severed respectively from that within the casting inlet in the vicinity of the casting hole and from that within the discharge outlet in the vicinity of the discharge hole, and then the casting mold is left in a high-temperature atmosphere to further proceed polymerization.

In a different embodiment, the gasket is comprised of an elastic resin, said casting inlet and said discharge outlet are provided on an outer circumference of said gasket, said severing in the vicinity of the casting hole and discharge hole is carried out by bending said polymerized portion within the casting inlet and that within the discharge outlet together with the casting inlet and the discharge outlet.

In another embodiment, the plastic lens is an eyewear lens.

The third aspect of the present invention for achieving the third object mentioned above is as follows:

One embodiment is a gasket for molding plastic lenses comprised of a cylindrical member comprising openings for fitting by insertion a first mold and second mold comprising a molding surface for forming an optically functional surface of plastic lenses, characterized in that said cylindrical member has;

a support member for positioning and holding said first mold by contacting at least a rim portion of the molding surface of said first mold;

a casting groove and a discharge groove that are cut downward from an end surface of the opening in a depth direction and positioned opposite on the same opening of the cylindrical member; and a casting inlet comprising an indentation opening to the same direction as the direction to which said casting groove is cut downward and communicating with said casting groove, and a discharge outlet comprising an indentation opening to the same direction as the direction to which said discharge groove is cut downward and communicating with said discharge outlet on an outer wall surface.

In another embodiment, the gasket is provided with a cast receiving member, on an outer side of said casting inlet, comprising an indentation surrounding a circumference of the casting inlet and opening to the same direction as the casting inlet.

In another embodiment, in an opening end portion of the cylindrical member on both sides of the opening end portion of said casting groove, a casting groove both-side member is provided that is one step lower than the opening end portion of the cylindrical member.

In a different embodiment, heights of an upper end of said casting groove both-side member and an opening end of said casting inlet are set so that the upper end of said casting groove both-side member and the opening end of said casting inlet are positioned on the same plane as an upper end of the rim portion of said first mold when the first mold is fitted with the opening of said cylindrical member so as to block said casting groove from an inner wall side of the cylindrical member.

In a different embodiment, said support member is also one for positioning and holding said second mold by contacting a rim portion of the molding surface of said second mold.

One embodiment is a casting mold for molding plastic lenses, wherein a first mold and second mold are detachably held in said opening of the gasket so that a molding surface of the first mold and a molding surface of the second mold are positioned opposite at a prescribed interval to form a cavity corresponding to a lens shape within the cylindrical member.

Another embodiment is a monomer casting jig equipped with a nozzle for casting a starting material monomer of plastic lens into the casting mold characterized in that a casting inlet seal member is provided around the nozzle, and said casting inlet seal member has a flat portion for contacting an opening end of said casting inlet, an upper end of said casting groove both-side member, and an upper end of the rim of said first mold of said casting mold (where the first mold is fitted with the opening of said cylindrical member so that said casting groove is blocked from an inner wall side of the cylindrical member).

In a different embodiment, the casting jig is provided with a fitting member fitting with a step portion of said cylindrical member on said casting inlet seal member.

BEST MODE OF IMPLEMENTING THE INVENTION

Figure 1:
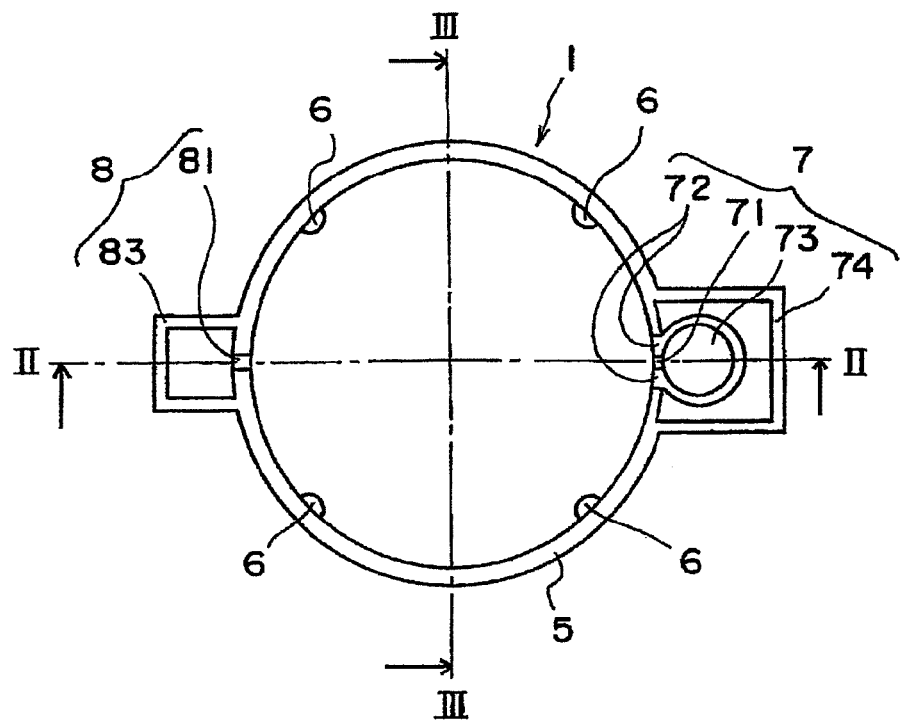
FIG. 1 is a plane view showing an example of the gasket for molding plastic lenses according to the present invention.

The first and second aspects of the present invention is a method of manufacturing an optical member (first aspect) and a method of manufacturing a plastic lens (second aspect) in which an isocyanate terminal prepolymer component (A) in the form of a reaction product of an aliphatic diisocyanate having an intramolecular cyclic structure and a diol having an average molecular weight of 300-2,500 is mixed with an aromatic diamine component (B), immediately after mixing, the mixture is cast into a casting mold and polymerized to obtain a molded article.

Component (A) is an isocyanate terminal prepolymer in the form of a reaction product of an aliphatic diisocyanate having an intramolecular cyclic structure and a diol having an average molecular weight of 300-2,500. Making the diisocyanate, one starting material of the aforementioned isocyanate terminal prepolymer, an aliphatic diisocyanate having an intramolecular cyclic structure facilitates control of the reaction during manufacturing or polymerizing the prepolymer and imparts suitable elasticity to the molded article finally obtained. Further, it imparts high heat resistance and good mechanical characteristics to the molded article obtained.

The aliphatic diisocyanate having an intramolecular cyclic structure is an aliphatic diisocyanate having a cyclic structure in the main chain or in the side chain. The cyclic structure may be alicyclic, aromatic, or heterocyclic. However, the aliphatic diisocyanate having an intramolecular cyclic structure is desirably an alicyclic diisocyanate from the perspective of preventing yellowing and maintaining adequate elasticity and hardness. Molded articles obtained with isocyanate having an aromatic ring tend to yellow more than those obtained with alicyclic diisocyanate; molded articles obtained with aliphatic chain-structured isocyanate tend to be softer and lose their shape more readily.

Examples of alicyclic diisocyanates are: 4,4'-methylenebis (cyclohexyl isocyanate), isophorone diisocyanate, 1,2-bis (isocyanate methyl)cyclohexane, 1,3-bis(isocyanate methyl) cyclohexane, 1,4-bis(isocyanate methyl)cyclohexane, 1,2-diisocyanate cyclohexane, 1,3-diisocyanate cyclohexane, and 1,4-diisocyanate cyclohexane. Examples of diisocyanates having aromatic rings are: m-xylylene diisocyanate, o-xylylene diisocyanate, p-xylylene diisocyanate, and m-tetramethylxylylene diisocyanate. It is particularly preferable that it is at least one selected from the group consisting of 4,4'-methylenebis(cyclohexyl isocyanate), isophorone diisocyanate, and 1,3-bis(isocyanate methyl)cyclohexane.

The average molecular weight of the diol that is the other starting material of the isocyanate terminal prepolymer of component A is 300-2,500. When the average molecular weight of the diol is less than 300, toughness cannot be imparted to the molded article obtained, and when greater than 2,500, the molded article obtained becomes soft and does not retain its shape. The average molecular weight of the diol is desirably 400-1,000. Examples of diols having an average molecular weight of 300-2,500 are polyether diols and polyester diols. These diols are preferred because of good compatibility with the other component. In the case of a diol of poor compatibility, it becomes necessary to add another component in the form of a compatibility enhancer to maintain the transparency of the molded article obtained, potentially resulting in loss of transparency.

Examples of such diols are: polyoxyethylene glycol, polyoxypropylene glycol, polyoxytetramethylene glycol, polyester diol comprised of ethylene glycol and adipic acid, polyester diol comprised of propylene glycol and adipic acid, polyester diol comprised of diethylene glycol and adipic acid, polyester diol comprised of 1,4-butane diol and adipic acid, polyester diol comprised of neopentyl glycol and adipic acid, polyester diol comprised of 1,6-hexanediol and adipic acid, polyester diol comprised of 1,10-decanediol and adipic acid, polyester diol comprised of 1,4-butanediol and sebacic acid, polycaprolactone diol comprised of ethylene glycol and ε-caprolactone, polycaprolactone diol comprised of propylene glycol and ε-caprolactone, polycaprolactone diol comprised of diethylene glycol and ε-caprolactone, polycaprolactone diol comprised of 1,4-butane diol and ε-caprolactone, polycaprolactone diol comprised of neopentyl glycol and ε-caprolactone, polycaprolactone diol comprised of 1,6-hexane diol and ε-caprolactone, polycaprolactone diol comprised of 1,10-decane diol and ε-caprolactone, and polycarbonate glycol. Preferred examples are: polyoxypropylene glycol, polyoxytetramethylene glycol, polyester diol comprised of 1,4-butane diol and adipic acid, polyester diol comprised of neopentyl glycol and adipic acid, polyester diol comprised of 1,6-hexane diol and adipic acid, and polyester diol comprised of 1,10-decane diol and adipic acid.

The isocyanate group content of isocyanate terminal prepolymer component (A) desirably falls within a range of 10-20 weight percent. When the above-stated isocyanate group content falls below the above-stated range, the hardness of the molded article obtained tends to decrease, and when the above-stated range is exceeded, it tends to become difficult to obtain toughness (adequate strength) of a molded article obtained. The above-stated isocyanate group content further preferably falls within a range of 11-15 weight percent.

Aromatic diamine component (B) may be one or more aromatic diamines denoted by general formula (I) above.

In general formula (I), $R_1$, $R_2$, and $R_3$ are each independently any of a methyl, ethyl, or thiomethyl group. Employing substituents $R_1$, $R_2$, and $R_3$ mentioned above can suppress crystallinity and enhance compatibility with the other components. When these substituents are absent or present in low numbers, crystallinity rises, resulting in handling difficulty. When employing the other substituents, compatibility with the other components deteriorates, resulting in apprehensively decreasing the transparency of the material obtained.

The following compounds are more specific examples of the above-stated aromatic diamines: 1,3,5-trimethyl-2,4-diaminobenzene, 1,3,5-trimethyl-2,6-diaminobenzene, 1,3,5-triethyl-2,4-diaminobenzene, 1,3,5-triethyl-2,6-diaminobenzene, 1,3,5-trithiomethyl-2,4-diaminobenzene, 1,3,5-trithiomethyl-2,6-diaminobenzene, 3,5-diethyl-2,4-diaminotoluene, 3,5-diethyl-2,6-diaminotoluene, 3,5-dithiomethyl-2,4-diaminotoluene, 3,5-dithiomethyl-2,6-diaminotoluene, 1-ethyl-3,5-dimethyl-2,4-diaminobenzene, 1-ethyl-3,5-dimethyl-2,6-diaminobenzene, 1-ethyl-3,5-dithiomethyl-2,4-diaminobenzene, 1-ethyl-3,5-dithiomethyl-2,6-diaminobenzene, 1-thiomethyl-3,5-dimethyl-2,4-diaminobenzene, 1-thiomethyl-3,5-dimethyl-2,6-diaminobenzene, 1-thiomethyl-3,5-diethyl-2,4-diaminobenzene, 1-thiomethyl-3,5-diethyl-2,6- diaminobenzene, 3-ethyl-5-thiomethyl-2,4-diaminotoluene, 3-ethyl-5-thiomethyl-2,6-diaminotoluene, and 3-thiomethyl-5-ethyl-2,4-diaminotoluene.

In the above-listed aromatic diamines, $R_1$ is desirably a methyl group and $R_2$ and $R_3$ each desirably represent either an ethyl group or thiomethyl group, in which case the molded article obtained tends not to fog and can be imparted with adequate toughness.

More specific examples of the above-stated aromatic diamines are: 3,5-diethyl-2,4-diaminotoluene, 3,5-diethyl-2,6-diaminotoluene, 3,5-dithiomethyl-2,4-diaminotoluene, and 3,5-dithiomethyl-2,6-diaminotoluene.

As for the mixing ratio of components (A) and (B), the molar ratio of the isocyanate group of component (A) with respect to the amino group of component (B) desirably falls within a range of 1.00-1.15 from the perspective of achieving adequate toughness (strength). The above-stated molar ratio further preferably falls within a range of 1.02-1.12.

In the manufacturing method of the present invention, components (A) and (B) are mixed, immediately after mixing, the mixture is cast into a casting mold and polymerized to obtain a molded article.

For polymerization reaction conditions and the like, suitable reference can be made to the conditions described in column 5 of U.S. Pat. No. 6,127,505; these will be also described in Examples further below.

To the extent that the transparency and strength of the molded article of the present invention are not lost, additives such as mold release agents, anti-oxidants, ultraviolet stabilizers, color blockers, and the like may be added as needed to the molded article of the present invention. Examples of additives are described in columns 6 to 7 of U.S. Pat. No. 6,127,505; however, this is not a limitation.

The manufacturing method of the first aspect of the present invention is characterized in that said component (A) is heated to a viscosity of 5000 CPS or less, the heated component (A) is passed through a filter while being pressurized to remove foreign matter comprised in component (A), subsequently degassed under a reduced pressure, and then subjected to said mixing.

The viscosity of isocyanate terminal prepolymer component (A) varies with the type, molecular weight, and the like of the monomer unit constituting the prepolymer. Normally, the viscosity at an ordinary temperature is on the order of several tens of thousands of CPS. Thus, conducting precision filtration requires raising the temperature to a suitable level to lower the viscosity. Accordingly, in the present invention, component (A) is heated to a viscosity of 5,000 CPS or less. At a viscosity of 5,000 CPS or less, it is possible to pass it through a filter while pressurizing. Component (A) is desirably heated to reach a viscosity of 500 to 2,000 CPS. Component (A) can be heated by charging component (A) to a tank equipped with a heating apparatus and conducting heating.

Component (A) that has been heated to a viscosity of 5,000 CPS or less is passed through a filter while being pressurized to remove foreign matter comprised in component (A).

In filtration of a liquid at a viscosity of 5,000 CPS or less, it is appropriate to use a pump to transfer the liquid in the tank to a filter and pass it through a filter medium to achieve the industrially required filtration rate. Said tank is connected with the filter via a pump and all connecting pipes and containers such as the tank are kept warm by a heat insulating equipment to minimize the drop in temperature, permitting efficient filtration.

Further, a temperature control means is desirably provided on the outer wall of the filter so that component (A) can pass through the filter at a constant temperature. This temperature control means can control the heating temperature of a liquid heating medium circulating on the outer surface of the wall or internally.

The filter through which component (A) is filtrated desirably has an absolute filtration precision ranging from 0.05 to 10 μm, for example, Component (A) can be filtrated through a filter having an absolute filtration precision of 0.05 μm or higher. Since the size limit of foreign matter that can be detected by the human naked eye is about 20 μm, a filter with an absolute filtration precision of 10 μm or less is capable of reliably removing foreign matter that can be detected by the naked eye.

Particularly in the present invention, taking into account the filtration rate, it is desirable to conduct precision filtration employing a filter with an absolute filtration precision ranging from 0.45 to 1 μm to remove minute foreign matter and produce clearer optical members.

Further, the material of the filter member of the filter employed is determined based on the filtration processing temperature, resistance to pressure differential, and the like. In particular, due to the high viscosity of component (A), those with little pressure loss during filtration or, due to the need to raise the temperature to achieve low viscosity, those with a high heat resistance temperature, are preferred. From such perspectives, the filter member of the filter is desirably one selected from the group consisting of: Teflon difluoride (PTFE), Teflon tetrafluoride (PTFE), polypropylene (PP), polyvinylidene fluoride (PVDF), polyphenylene sulfide (PPS), cellulose, Nylon 66, 304 stainless steel, and 316 stainless steel.

The pressure applied to pass the heated component (A) through the filter is not specifically limited and can be suitably determined in consideration of the absolute filtration precision of the filter, the level of resistance to pressure differential of the filter and the like.

Since component (A) from which foreign matter has been removed by passage through the filter contains numerous bubbles generated during filtration through the filter, it is degassed under a reduced pressure. The reduced pressure for degassing is suitably determined in consideration of the quantity of bubbles contained in component (A), the viscosity (that is, ease of degassing) of component (A), the degassing time, and the like. For example, during degassing, the pressure can be reduced to 0.6 Torr or less for 0.5 to 3 hours while maintaining the viscosity of component (A) within a range of 800 to 1,500 CPS.

It is also appropriate to filter and degas component (B). It suffices for the filter employed in the filtration of component (B) to have an absolute filtration precision of about the same as, or lower than, that used in the filtration of component (A). The use of a filter with an absolute filtration precision of 10 μm or less is desirable because it permits the reliable removal of foreign matter detectable by the naked eye, while the use of a filter with an absolute filtration precision of 1 μm or less is further preferred because it permits the removal of minute foreign matter and thus the production of clearer lenses. Further, due to the lower viscosity of component (B), there is no need to reduce the viscosity by heating, as is required to facilitate filtration and degassing for component (A). To the contrary, maintaining a low temperature (for example, room temperature or below) is desirable to prevent decomposition and discoloration of the material. Further, although specific precision filtration is conducted prior to feeding component (A) into the RIM machine, it suffices to provide a filter of high filtration precision (for example, an absolute filtration precision of 10 μm or less) in the RIM machine and conduct filtration of component (B). In that case, filtration prior to feeding into the RIM machine can also be omitted.

Component (A), from which foreign matter and bubbles have been removed in this manner, is mixed with component (B), and immediately after mixing, the mixture is cast into the casting mold to obtain a molded article. More specifically, component (A), from which foreign matter and bubbles have been removed in this manner, and component (B), which has been separately prepared, are fed into the aforementioned RIM machine, and mixing and cast polymerization are appropriately conducted within the RIM machine.

Figure 19:
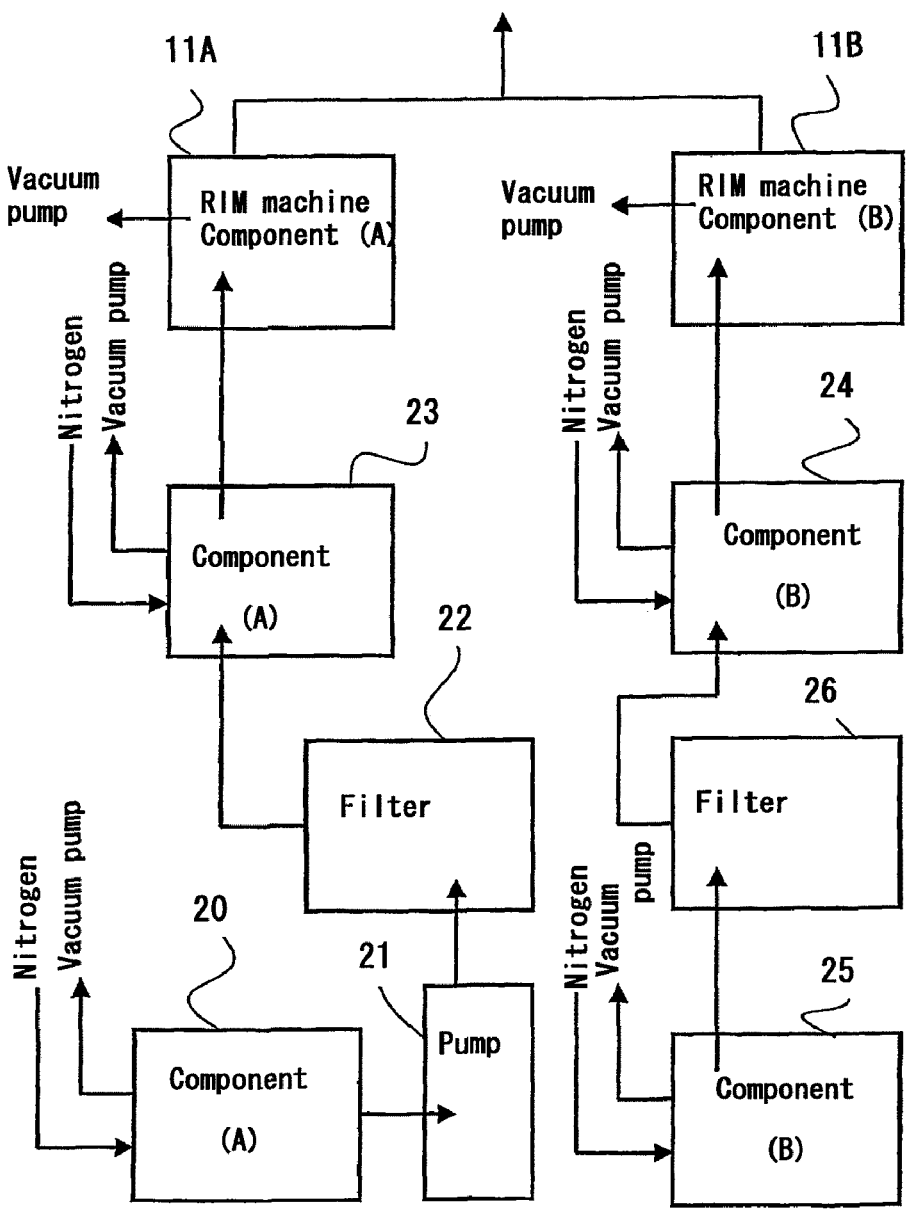
FIG. 19 is a descriptive drawing of one form of the device employed in the manufacturing method of the present invention.

These steps will be further described based on the schematic diagram shown in FIG. 19.

Component (A) is fed into a storage tank 20 and heated to a prescribed temperature. Within storage tank 20, as well, the pressure is desirably reduced with a vacuum pump to conduct degassing. Thus, the gas present in component (A) can be removed in advance, thereby shortening the degassing time in buffer tank 23. Within storage tank 20, while feeding an inert gas such as nitrogen into storage tank 20 to maintain the interior of storage tank 20 at a pressure of atmospheric pressure or higher, component (A), which has been heated to a prescribed temperature, is fed by pump 21 to filter 22 where foreign matter is removed, and then transferred to buffer tank 23. Within buffer tank 23, the pressure is reduced by a vacuum pump to conduct degassing. Thus, the bubbles generated during passage through filter 22 are removed. Fully degassed component (A) is then fed to a material tank 11A within a RIM machine equipped with a filter of 100 μm absolute filtration precision.

The transfer from buffer tank 23 to material tank 11A of the RIM machine is accomplished by means of a pump or a pressure differential. Transfer by pressure differential refers to a method of transferring a component where the pressure within the source tank is maintained positive by feeding an inert gas such as nitrogen, while the pressure in the destination tank is kept lower (for example, at atmospheric pressure) than the pressure in the source tank.

Component (A), from which the foreign matter and bubbles have thus been removed, is fed to a RIM machine equipped with a filter of 100 μm absolute filtration precision and employed as a starting material, readily permitting molding at targeted discharge levels.

Component (B) is fed to storage tank 25 and maintained at a prescribed temperature. In storage tank 25, degassing may be conducted by reducing the pressure with a vacuum pump. However, since the viscosity of component (B) is low, bubbles generated during passage through the filter can be readily removed following passage through the filter and thus degassing can be omitted. In storage tank 25, component (B) that has been maintained at a prescribed temperature is fed to filter 26 by means of the pressure differential between storage tank 25 and buffer tank 24 to remove foreign matter, and then transferred to buffer tank 24. In buffer tank 24, the pressure is reduced by a vacuum pump and degassing is conducted. Adequately degassed component (B) is then transferred by means of a pressure differential to material tank 11B in the RIM machine. It is also possible not to provide buffer tank 24, but to cause it to pass from storage tank 25 through filter 26 and transfer directly to material tank 11B of the RIM machine, with degassing being conducted in material tank 11B.

Components (A) and (B) are mixed in the RIM machine, and immediately after mixing, the mixture is cast into the casting mold to obtain a molded article. Components (A) and (B) are mixed with a shaft rotating at high speed or a static mixer to obtain a uniform mixed solution of the two liquids.

The mixed solution thus obtained is immediately cast into the casting mold. Here, the term "immediately" means before completion of polymerization of components (A) and (B). This will vary with the composition of components (A) and (B); however, by way of example, their casting into the casting mold is begun within about 0.5 to 2 seconds.

The temperature (viscosity) of component (A) when being mixed with component (B) is suitably determined in consideration of the optimal temperature for polymerization. However, the greater the temperature at which components (A) and (B) are mixed, the faster the polymerization reaction and the greater the tendency for bubbles and optical defects to be produced during casting into the casting mold. Thus, to the extent that the RIM machine is not impaired (for example, at 5,000 CPS or less), it is desirable to set a temperature (higher viscosity) lower than that encountered during passage through the filter and degassing. Since the filtration precision of the filter in the RIM machine is lower than that of the filter in the filter filtration step, a targeted discharge quantity can be achieved even when the viscosity increases somewhat.

The polymerization conditions (temperature, duration, and the like) in the casting mold can be suitably determined in consideration of the types of components (A) and (B), and the like. Suitable reference can be made to the conditions described in column 5 of U.S. Pat. No. 6,127,505, for example, for specific polymerization reaction conditions and the like. These will also be provided in detail in Examples further below.

To the extent that the transparency and strength of the molded article are not lost, additives such as mold release agents, anti-oxidants, ultraviolet stabilizers, color blockers, and the like may be added as needed to the molded article of the present invention. Examples of additives are described in columns 6 and 7 of U.S. Pat. No. 6,127,505.

The manufacturing method of the present invention yields molded articles, particularly transparent molded articles. Examples of transparent molded articles are: lenses such as eyewear lenses and optical lenses; prisms; optical fiber; recording media substrates employed in optical disks, magnetic disks, and the like; and items employed in optical applications such as optical filters. The transparent molded articles of the present invention are preferably employed as lenses, particularly preferably eyewear lenses.

In the manufacturing method of the second aspect of the present invention, mixing of components (A) and (B) is preferably conducted after heating component (A) to reduce the viscosity thereof from the perspective of avoiding bubble defects.

Since component (A) is generally of high viscosity, prior to mixing with component (B), it is desirably heated to a viscosity of 8,000 CPS or less from the perspective of facilitating mixing with component (B) by imparting a certain degree of fluidity. At or below this viscosity, degassing prior to mixing when employing a RIM machine, described further below, is readily conducted. The temperature to which component (A) is heated preferably corresponds to a viscosity of 6,000 CPS or less, more preferably 4,000 CPS or less.

A reaction injection molding ("RIM" hereinafter) machine is desirably employed to mix components (A) and (B).

Figure 18:
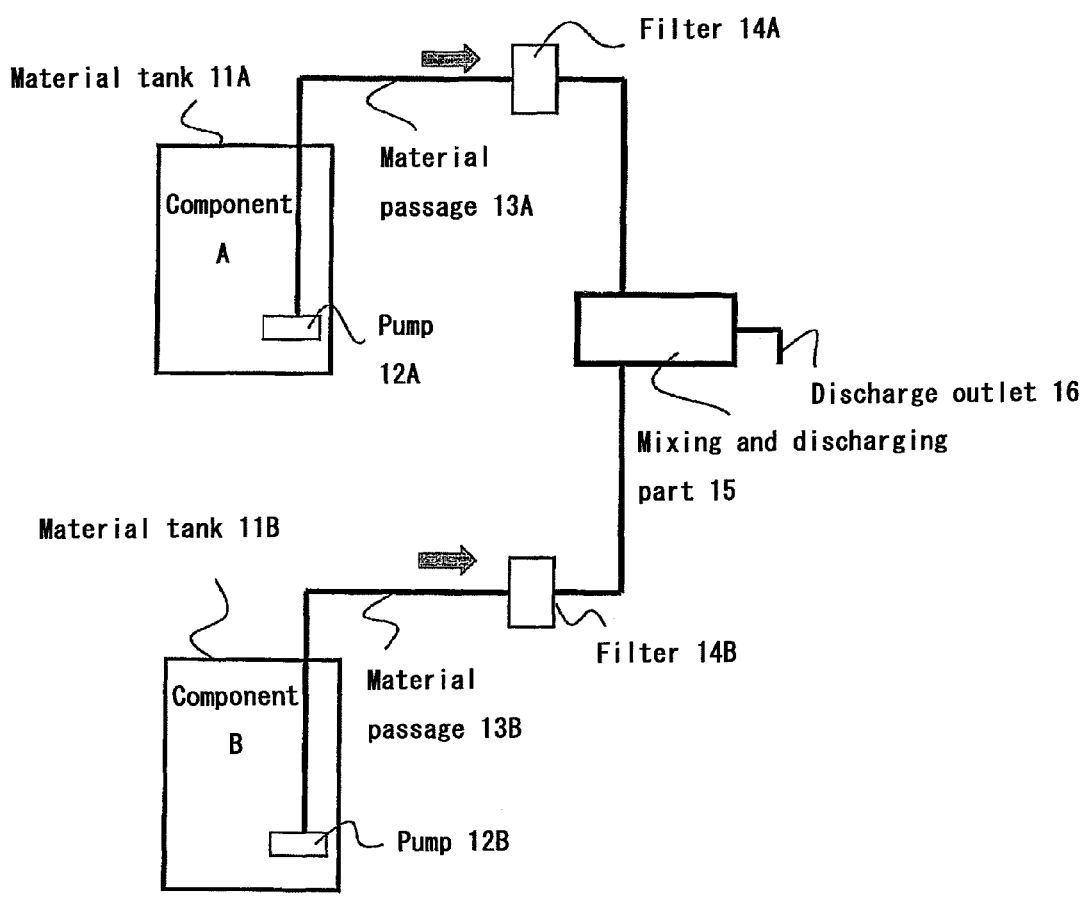
FIG. 18 is a descriptive drawing of the structure of a RIM machine.

The configuration and operation of the RIM machine will be described below based on FIG. 18.

The RIM machine is comprised of material tank 11A storing component (A); material tank 11B storing component (B); mixing and discharging part 15 mixing and discharging components (A) and (B); material flow passage 13A connecting material tank 11A with mixing and discharging part 15; and material flow passage 13B connecting material tank 11B with mixing and discharging part 15. In the middle of material flow passages 13A and 13B, filters 14A and 14B are respectively provided for filtration of foreign matter in these components. A shaft rotating at high speed or a static mixer is provided in mixing and discharging part 15 to mix components (A) and (B) arriving over material flow passages 13A and 13B.

Components (A) and (B) are held at a reduced pressure in their respective material tanks mentioned above, adequately degassed, and maintained at a prescribed temperature. When degassing is inadequate, bubbles sometimes enter the molded article, compromising the properties and external appearance of the finished product and tending to reduce the mechanical strength of the molded article. Once they have been adequately degassed and rendered uniform in temperature, the respective components are forced by pumps 12A and 12B from material tanks 11A and 11B over material flow passages 13A and 13B and through filters 14A and 14B into mixing and discharging part 15. The mixed solution that has been rapidly and uniformly mixed in mixing and discharging part 15 is discharged through discharge outlet 16.

The manufacturing method of the second aspect of the present invention will be described below in detail.

The casting mold employed in the manufacturing method of the second aspect of the present invention has a mold for forming one side of the lens and a mold for forming the other side thereof, that are positioned opposite at a prescribed interval, a circular gasket is positioned around said two molds, and a cavity is formed by said molds and gasket, said gasket has a casting hole for casting a mixture of said components (A) and (B) into said cavity and a discharge hole for discharging gas and said mixture in said cavity to an exterior of the casting mold, that are positioned opposite in a diameter direction. As such a casting mold, the casting mold having the gasket of the third aspect of the present invention described below can be employed.

Figure 9:
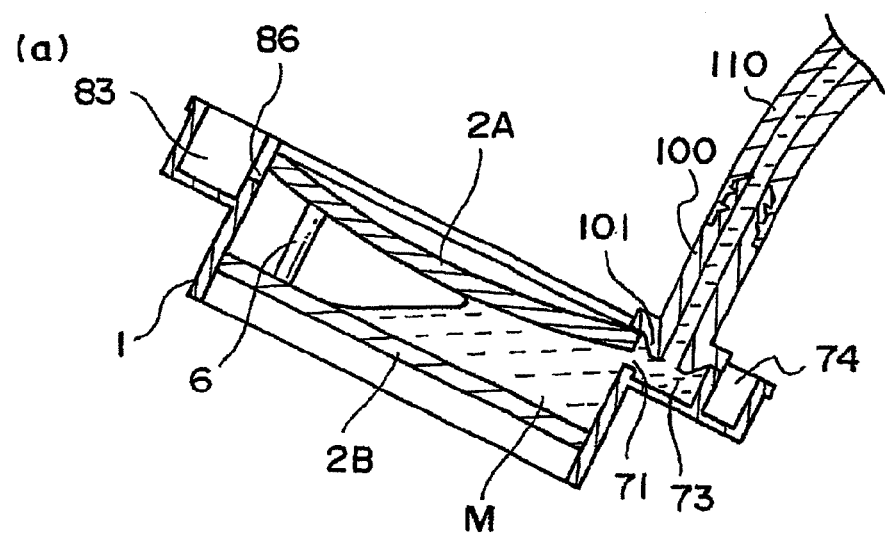
FIG. 9 is a drawing FIG. 9(*a*) and (*b*) are drawings showing how starting material monomer is cast into a cavity of a casting mold employing the casting gasket of the present invention with the casting jig of the present invention.
Figure 9:
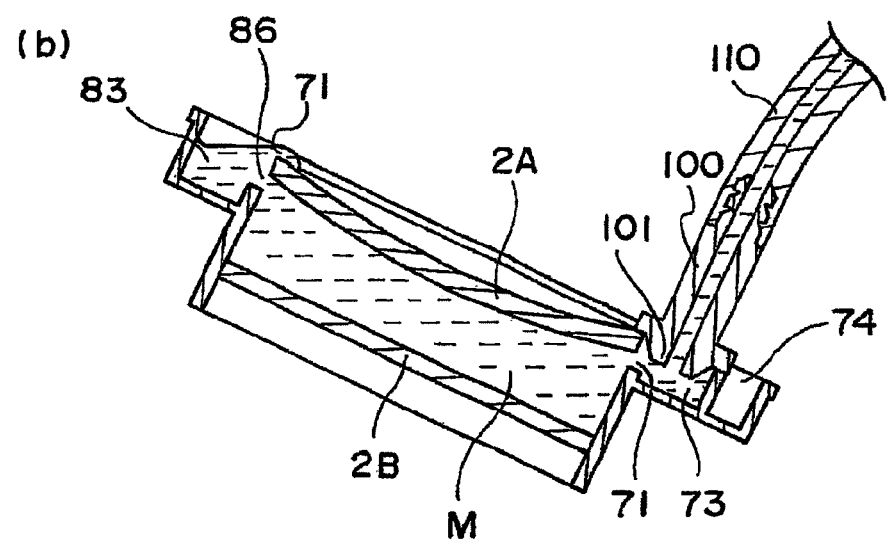

In the manufacturing method of the second aspect of the present invention, the casting of the mixed solution into the casting mold is carried out in a state that the casting mold is tilted from or perpendicular to a horizontal plane as well as discharge hole 86 is positioned at a top. FIG. 9 shows the tilted state. In this case, casting mold 1 is tilted from a horizontal plane and mixed solution M is cast through casting jig 100 into casting inlet 73. When the mixed solution is cast from below the casting mold with the casting mold in a tilted or perpendicular state, the mixed solution fills from beneath the surface of the mixed solution that has been already poured, thereby preventing air in the casting mold from being involved and tending not to form bubbles. Since the surface of the mixed solution gradually rises from below, none of the turbulent convection occurring within the cavity during conventional introduction from above takes place, thus tending to prevent the occurrence of marks such as flow-like marks and those caused by polymerization nonuniformity and tending to prevent the generation of optical defects.

A mixed solution of high viscosity is employed in the manufacturing method of the second aspect of the present invention. Therefore, if the raising rate of the surface of the mixed solution in the cavity varies depending on its position, there may be a problem in that air in the vicinity of the solution surface slowly raising is left behind within the cavity. The greater the angle of incline imparted to the casting mold, the smaller localized differences in the rate of rise of the liquid surface become, tending to prevent such a problem; such tilting is thus desirable. In particular, when molding lenses to correct myopia, the cavity in the casting mold presents a narrow gap near the center and a wide gap along the rim. Thus, the mixed solution tends to flow toward the rim rather than the center. Accordingly, when a small angle of incline is imparted, the surface of the solution along the two sides rises more rapidly than the surface of the solution near the center, trapping air near the center. When the discharge hole is reached, there may be a problem in that air near the center is sometimes left behind within the cavity. In such cases, the greater the angle of incline imparted, the smaller the difference in the rate of rise of the solution surface along the rim and the center, tending to prevent air near the center from being left behind; such tilting is thus desirable.

As shown in FIG. 9(b), the casting of the mixed solution into the casting mold can be conducted at a prescribed incline until cavity 4 is filled with mixed solution M and casting is completed. However, when employing a gasket having a casting inlet opening upward when positioned horizontally as mentioned above, the casting mold can be tilted slightly until the casting jig has been connected to the casting inlet, and once the connection has been made, the casting mold can be immediately tilted to a prescribed angle and casting can be continued.

Mixed solution M is desirably cast into casting mold 1 through tube 110, one end of which is mounted in a detachable manner to a discharge outlet provided in a mixing chamber in which components (A) and (B) are mixed, and the other end of which is connected to casting hole 73 of casting mold 1. Since components (A) and (B) polymerize rapidly, the mixed solution gradually adheres to the inner wall of the tube during casting, compromising passage of the mixed solution through the tube. Mounting the tube in a detachable manner facilitates replacement.

In the manufacturing method of the second aspect of the present invention, the casting mold is desirably heated prior to casting of the mixed solution.

During the casting of the mixed solution of components (A) and (B) through the casting inlet of casting mold 1, when the temperature of the casting mold is lower by more than a certain amount than the temperature of the mixed solution, a thin film of air forms on the surface of the mold during transfer of the mixed solution along the mold surface, causing bubble defects. Heating the casting mold increases wettability and reduces such problems.

The temperature of the casting mold immediately prior to casting of the mixing solution is desirably close to or greater than the temperature during casting of the mixed solution to enhance wettability. Specifically, it is appropriate that the casting mold is placed in an electric furnace or far-infrared furnace and heated to a prescribed temperature, and the mixed solution is then cast into the casting mold removed from the furnace.

The casting mold thus filled with the mixed solution is then left undisturbed for a certain period in a relatively low-temperature atmosphere (for example, at room temperature) at which polymerization will progress primarily by self-heating, either tilted at some angle or maintained horizontally so that none of the mixed solution spills out, and the mixed solution is polymerized. Subsequently, it is preferable that, before polymerization has progressed to completion, the polymerized portion in the vicinity of the casting hole and the polymerized portion in the vicinity of the discharge hole are broken, and the polymerized lens molded article portion within the cavity is severed from the portions that have polymerized within the casting inlet and discharge outlet. Once this severing has been completed, the casting mold is placed in a furnace that has been preheated to a prescribed temperature to generate a high-temperature atmosphere, and the functional groups that did not react during polymerization in the above-mentioned low-temperature atmosphere are caused to react while alleviating internal distortion. Once polymerization has been completed, the temperature is gradually reduced, and the casting mold is removed from the furnace. For example, this heating at a high-temperature atmosphere is conducted for about 15 to 24 hours at 110 to 150° C. When the casting mold is removed from the furnace, the gasket is first removed, the first and second molds are then removed, and the plastic lens molded article is finally obtained.

While being left in the above low-temperature atmosphere, the mixed solution self-heats through the reaction heat of polymerization, and polymerization progresses further. However, when polymerization advances to a certain degree, little heat is generated and the polymerization reaction is gradually settled. When being left continuously in this state, polymerization shrinkage becomes large as the polymerization reaction progresses. Therefore, internal distortion increases, and the molded lens article may crack or separate from the mold.

Thus, the period of leaving in a low-temperature atmosphere is appropriately set to equal or longer than the time required for polymerization to progress to a degree permitting to sever portions polymerized within the casting inlet and discharge outlet from those polymerized within the cavity, and to be less than the time required for internal distortion due to polymerization shrinkage to increase to the point where it cause some trouble in molding. For example, the period of leaving desirably falls within a range of 5 to 20 minutes.

During being left in a low-temperature atmosphere, the gasket is desirably left undisturbed so that it is not rocked. It is particularly desirable to leave undisturbed prior to the severing operation. Since this prevents the mixed solution proceeding polymerization from flowing within the cavity, it is possible to reduce optical defects in the molded lens article.

In polymerization by self-heating in a low-temperature atmosphere, curing takes place in a state where polymerization is not fully completed and unreacted functional groups remain; the strength achieved is not as high as that of the completed molded article. Thus, in polymerization in a low-temperature atmosphere, polymerized portions in vicinity of the casting hole and discharge hole are readily severed; this is accomplished by bending the polymerized portions within the casting inlet and discharge outlet. That is because, in this manner, stress is concentrated on the thinnest polymerized portions positioned in vicinity of the casting hole and discharge hole. The gasket is desirably comprised of an elastic resin so that the whole casting inlet and whole discharge outlet can be bent, facilitating the severing operation.

The gasket can be readily removed following removal from the furnace since severing is made at the casting hole portion and discharge hole portion prior to placement in the furnace.

The plastic lens obtained by the manufacturing method of the second aspect of the present invention can be employed, for example, as an eyewear lens or an optical lens. It is particularly desirable for the plastic lens obtained by the manufacturing method of the second aspect of the present invention to be employed as an eyewear lens.

The gasket of the third aspect of the present invention will be described below with reference to the drawings. In the manufacturing method of the second aspect of the present invention, the gasket of the present invention set forth in detail below may be employed.

First Example

FIGS. 1 to 4

Figure 2:
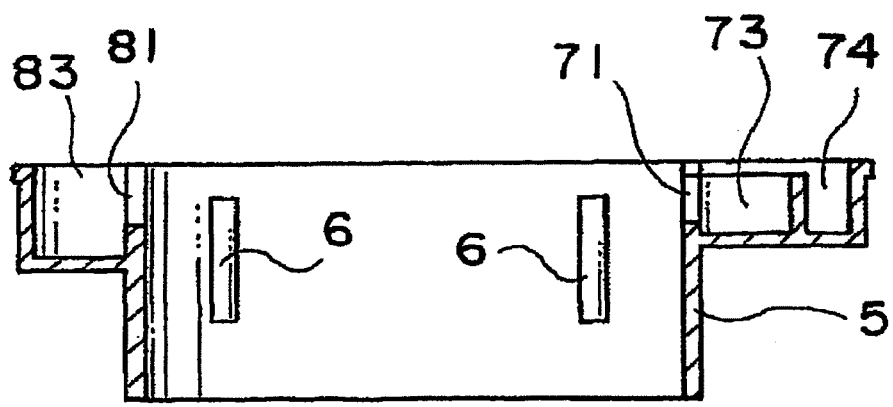
FIG. 2 is a sectional view along section line II-II in FIG. 1.
Figure 3:
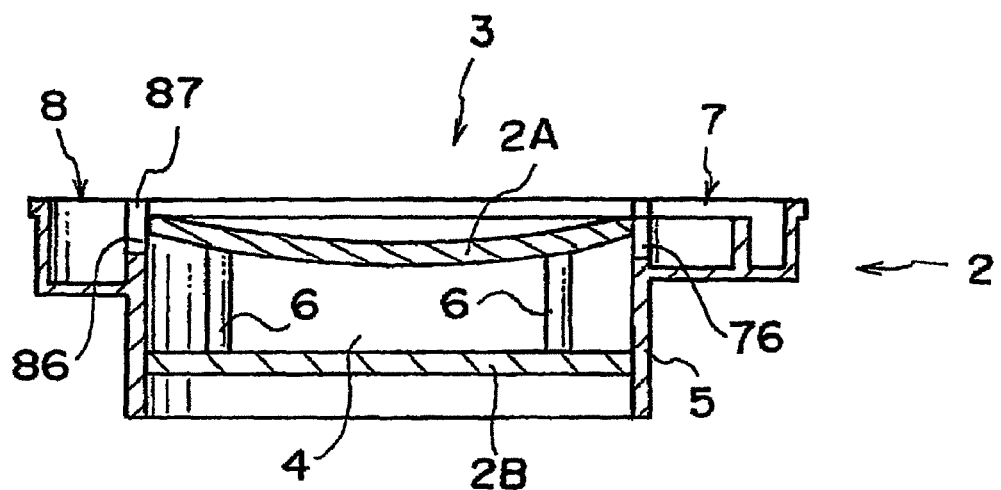
FIG. 3 is a sectional view of the gasket of FIG. 1 equipped with molds.
Figure 4:
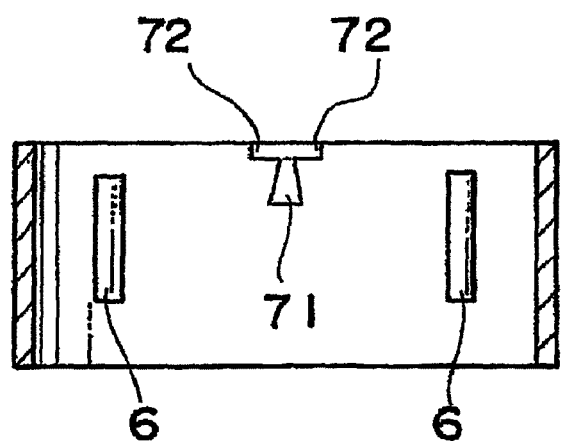
FIG. 4 is a sectional view along section line in FIG. 1.

FIG. 1 is a plane view of the gasket for molding plastic lenses relating to First example of the third aspect of the present invention. FIG. 2 is a sectional view along section line II-II in FIG. 1. FIG. 3 is a sectional view of the gasket showing in FIGS. 1 and 2 equipped with lens master molds. FIG. 4 is a sectional view along section line III-III in FIG. 1.

As shown in FIG. 3, gasket 1 of the first example of the third aspect of the present invention is equipped with lens master mold 2 comprised of first mold 2A and second mold 2B, forming an internal cavity 4 and constituting a lens casting mold 3.

Gasket 1 is comprised of cylindrical member 5, both ends of which are open; support member 6 protruding from the inner wall of cylindrical member 5 so as to support at least the rim portion of first mold 2A; casting member 7 provided on the circumference of cylindrical member 5 for casting a monomer into cavity 4; and discharge member 8, also positioned on the surface of the outer wall of the cylindrical member, for discharging gas and a surplus monomer present in the cavity during casting the monomer.

Gasket 1 is comprised of an elastic resin, examples of which are: ethylene acetate vinyl copolymer, polyethylene, polyethyl acrylate, and silicone rubber.

A further example is a mixed product of polypropylene and ethylene propylene rubber (for example, the product Santoprene, made by Advanced Elastomer Systems Corp.). This material is desirable because of high resistance to heat.

Cylindrical member 5, support member 6, casting member 7, and discharge member 8 can be integrally molded by injection molding.

First mold 2A and second mold 2B constituting lens master mold 2 are comprised of, for example, glass and are round when viewed from the front. The rims of the first and second molds desirably have a shape capable of maintaining gapless contact with the inner wall surface of cylindrical member 5 of gasket 1.

First mold 2A, for example, may be a convex mold having a molding surface on its convex side for molding the rear surface (concave surface) of the plastic lens. Second mold 2B may be concave mold having a molding surface on its concave side for molding the front surface (convex surface) of the plastic lens. However, these are not limitations.

Having first mold 2A be a convex mold and second mold 2B be a concave mold is advantageous in that air tends not to remain in the cavity during monomer casting.

The inner diameter of cylindrical member 5 of gasket 1 can be made essentially identical to or somewhat smaller than the outer diameter of the aforementioned first mold 2A and second mold 2B. However, as stated above, it is appropriate to be of a size capable of maintaining a state of gapless contact with the inner wall surface of cylindrical member 5.

As needed, the mold that is installed in the gasket may be gripped with springs or the like to insert into cylindrical member 5 from both sides, permitting fixing it in the gasket.

It is sufficient for cylindrical member 5 to have a height capable of ensuring the thickness of the rim portion of the lens to be molded (the thickness of the rim portion of cavity 4) and the thickness required to hold the rim portions of first mold 2A and second mold 2B. However, as shown in FIG. 3, it is preferable that the top opening of cylindrical member 5 extends beyond the upper edge of the rim portion of first mold 2A because the monomer tends not to overflow to the exterior of the casting mold during monomer casting, described further below.

When the second mold is convex in shape toward the opening of the cylindrical member, it is desirable for the height of the cylindrical member to be set so that the lower edge of the cylindrical member is lower than the top of the convex surface of the second mold. That is because, when lens casting mold 3 is positioned as shown in FIG. 3, the convex surface of second mold 2B does not extend beyond the opening of the cylindrical member and strike whatever is beneath it.

Support members 6 of gasket 1 are desirably positioned at three or more spots circumferentially spaced along the inner wall surface of cylindrical member 5; in FIGS. 1 to 3, they are provided in a protruding manner in four spots. The individual shape of support members 6 may be semicylindrical and axially parallel to the axis of the cylindrical member, for example. The upper and lower surfaces of the support member contact the molding surface rim portion of first mold 2A and the molding surface rim portion of second mold 2B. The height or position of this contact portion is suitably designed in conformity to the shape of the rim portion of the molding surface of the mold. In FIGS. 1 to 3, the molding surfaces of first mold 2A and second mold 2B are spherical. The position (height) of the upper surface and the position (height) of the lower surface of these four support members are made identical.

Support members 6 may be separately provided as protrusions supporting first mold 2A and protrusions supporting second mold 2B. Alternatively, support members 6 may be provided in the form of a belt running around the inner wall surface of cylindrical member 5. In the case of belt-shaped support members 6, belt-shaped protrusions supporting first mold 2A and belt-shaped protrusions supporting second mold 2B may be integrally formed or independently formed.

Support members 6 may also be provided only to support first mold 2A, with no protrusions provided to support second mold 2B. In that case, second mold 2B is pushed down to a prescribed position in the gasket and held in place by the elasticity of the gasket.

It is sufficient for support member 6 to have a protrusion capable of contacting the rim portion of the molding surface of the mold; the structure thereof is not otherwise limited. For example, the shape and number thereof may be varied optionally, and the upper and lower contact portions may be provided as separate protrusions, or as a belt-shaped protrusion running in a circumferential direction. A detailed description of this point will be given the third example, further below.

Casting member 7 of gasket 1 is comprised of casting groove 71 comprising a groove cut downward from the top of cylindrical member 5; casting inlet 73 provided on the outer wall surface of cylindrical member 5, communicating with casting groove 71, and having an indentation opening in the same direction as casting groove 71; and cast receiving member 74, surrounding the casting inlet with an indentation opening in the same direction as casting groove 71.

Casting groove 71 is cut downward to a position beyond the portion at which the support member positioned adjacent to casting groove 71 contacts the rim portion of the molding surface of first mold. That is, the depth of casting groove 71 is such that gasket 1 reaches cavity 4 formed by it together with the first and second molds without running beyond cavity 4. The use of such a configuration allows starting material monomer to flow from casting inlet 73 through casting groove 71 into cavity 4.

The width of casting groove 71 is desirably configured (FIG. 4) with a narrow top that widens toward the bottom. Narrowing the groove at the top facilitates sealing with the casting jig. Further, widening the groove at the bottom increases the size of the casting hole, facilitating the flow of monomer into the cavity.

A step that is one step lower than the opening end portion of cylindrical member 5 is provided in the opening end portion of cylindrical member 5 on both sides of the opening end portion of casting groove 71 (FIG. 4). This portion that is one step lower is called casting groove both-side member 72. From the perspective of preventing monomer overflowing out of casting member 7 from flowing onto the first mold during monomer casting and thus to the exterior of the casting mold, the height of casting groove both-side member 72 is desirably set so as to align with the top of the rim portion on the opening side when first mold 2A is installed in casting mold gasket 1.

The wall portion of casting inlet 73 connects to casting groove both-side member 72, and the height of the opening end of casting inlet 73 is made identical to the height of the top of casting groove both-side member 72 (FIG. 2). The use of such a structure is desirable because it makes it possible to position the top of the casting groove both-side member and the opening end of the casting inlet on the same plane; thus, it suffices to make both the casting groove provided in the casting jig and the contact portion for sealing the opening of the casting inlet flat to permit sealing by means of a simple configuration.

Further, it is further desirable to make the top of the rim portion of first mold 2A the same height as the top of the casting groove both-side member and the casting inlet opening end. Thereby, it suffices to make the contact portions of the mold rim, top of the casting inlet, and top of the casting groove both-side member flat to permit sealing with an even simpler structure, thus further facilitating sealing.

Second Example

FIG. 5

Figure 5:
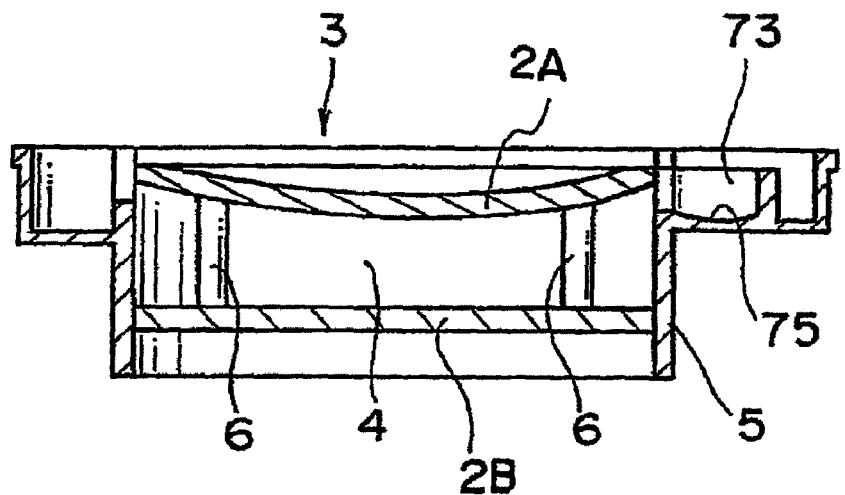
FIG. 5 is a sectional view of the gasket of another example according to the present invention equipped with molds.

FIG. 5 is a sectional view showing a state where the gasket for molding plastic lenses relating to the second example of the present invention is equipped with a lens master mold. In the sectional view shown in FIG. 5, bottom 75 of the concave portion of casting inlet 73 is concavely curved. When the bottom is angular, bubbles tend to remain in the corners. These bubbles sometimes enter the cavity during casting. Making the bottom concavely curved causes bubbles to tend not to remain in casting inlet 73, preventing bubbles from mixing into the plastic lens being molded. Accordingly, as shown in FIG. 5, bottom 75 of the concave portion of casting inlet 73 is desirably a concavely curved in the present invention.

The top of the rim portion of first mold 2A shown in FIG. 5 is desirably at the same height as the top of casting groove both-side member 72 and the opening end of casting groove 71. In particular, an upward-turning flat portion connecting the top and lateral surfaces is desirably formed along the rim on top of the rim portion of first mold 2A to impart the same height to the flat portion, the top of casting groove both-side member 72, and the opening end of casting groove 71. This eliminates any gap with the casting jig, further facilitating, and rendering more reliable, sealing during casting.

Points common to both the first and second example will be described below.

The wall portions of cast receiving member 74 communicate with the outer wall surface of cylindrical member 5. The height of the top of these wall portions is suitably configured to be identical to the height of the cylindrical member. Thus, the top of the wall portion of cast receiving member 74 is higher than the opening end of casting groove 71, affording the following three advantages. (1) The amount of monomer overflowing from casting inlet 73 that can be collected is large. (2) When the casting mold is positioned horizontally after casting, monomer overflowing from cast receiving member 74 returns to casting inlet 73, so monomer waste can be reduced. Further, monomer overflowing from casting inlet 73 flows onto the upper surface of the first mold via the top of casting groove both-side member 72, and thus tends not to spill. (3) The monomer that spills while casting the monomer with casting member 73 tilted downward is readily recovered.

Discharge member 8 is comprised of discharge groove 81 comprised of a groove cut downward from the top of cylindrical member 5 at a position opposite to casting groove 71 of casting member 7 in a diameter direction, and discharge outlet 83 provided on the outer wall surface of cylindrical member 5 and having an indentation communicating with discharge groove 81.

Casting groove 81 is cut downward to a position beyond the portion at which the support member positioned adjacent to casting groove 81 contacts the rim portion of the molding surface of first mold. That is, casting groove 81 is formed to have a depth reaching the cavity, as casting groove 71. Positioning discharge groove 81 opposite to casting groove 71 in a diameter direction affords the advantage of completely discharging all air without impediment when casting starting material monomer with casting member 7 positioned downward.

The wall portion of discharge outlet 83 communicates with the outer wall surface of cylindrical member 5, and the height of the opening end is suitably made identical to that of cylindrical member 5. The height of the opening end of the discharge outlet is suitably determined in consideration of the following two points. That is, the upper surface of the solution collected in the discharge outlet when the casting mold is horizontally positioned is desirably positioned above a discharge hole. This is because, through the discharge outlet, the monomer is supplied instead of entering of air when the monomer polymerizes and shrinks. Further, it is desirable for the opening end to be made higher than the top of the rim of the first mold to flow the monomer overflowing from the discharge outlet onto the first mold without spilling downward.

When gasket 1 is equipped with first mold 2A, the gasket inner wall surface and the rim of the first mold contact each other in a state where the top of the first mold rim aligns with the top of casting groove both-side member 72. Thus, the top of casting groove 71 on the inner wall surface side of the cylindrical member is blocked by the rim of the first mold, with casting hole 76 connecting the cavity with the casting inlet being formed on the lower part of casting groove 71. Similarly, since discharge groove 81 is blocked on the cylindrical member inner wall surface side by the rim of the first mold, discharge hole 86 connecting cavity 4 with discharge outlet 83 is formed on the lower part of discharge groove 81, and flow groove 87 connecting discharge outlet 81 with an indentation formed by the upper surface of first mold 2A and cylindrical member 5 is formed on the upper part of discharge groove 81.

Mounting first mold 2A in the opening on the side of gasket 1 of the present invention where casting groove 71 is located causes casting groove 71 to be blocked by the rim of first mold 2A on the upper side, forming a casting hole on the lower side. Similarly, discharge groove 81 is blocked in its middle portion by the rim of first mold 2A, forming a discharge hole on the lower side and a flow groove on the upper side. As a result, during casting, the monomer overflowing from casting inlet 73 collects in the cast receiving member 74 surrounding casting inlet 73 and does not spill downward. Further, the monomer overflowing from discharge inlet 81 flows through the aforementioned flow groove 87 into the indentation formed by first mold 2A and cylindrical member 5, and thus does not spill out to the exterior of the casting mold.

Third Example

FIGS. 13 to 16

Figure 13:
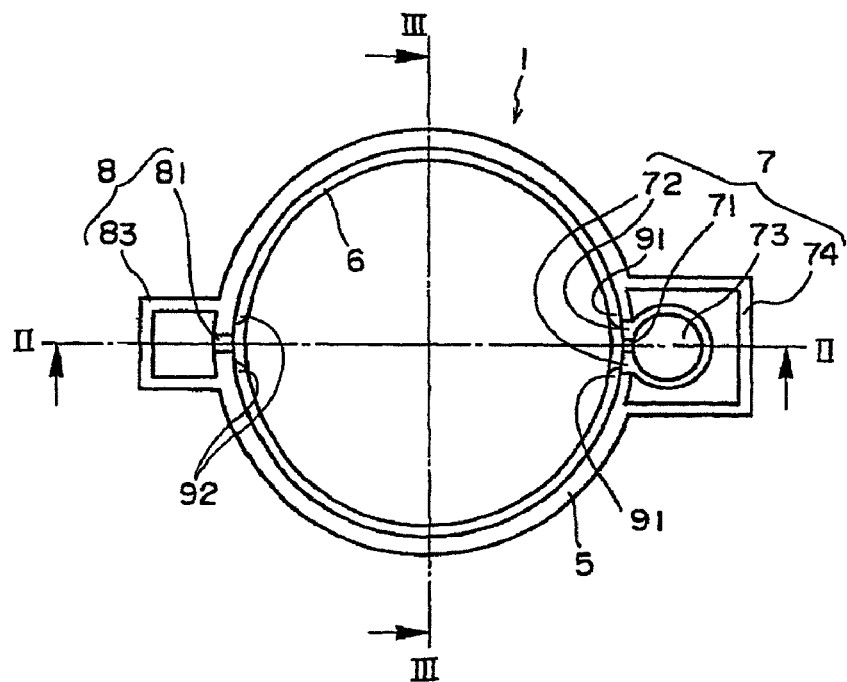
FIG. 13 is a plan view of another example of the gasket for molding plastic lenses according to the present invention.
Figure 14:
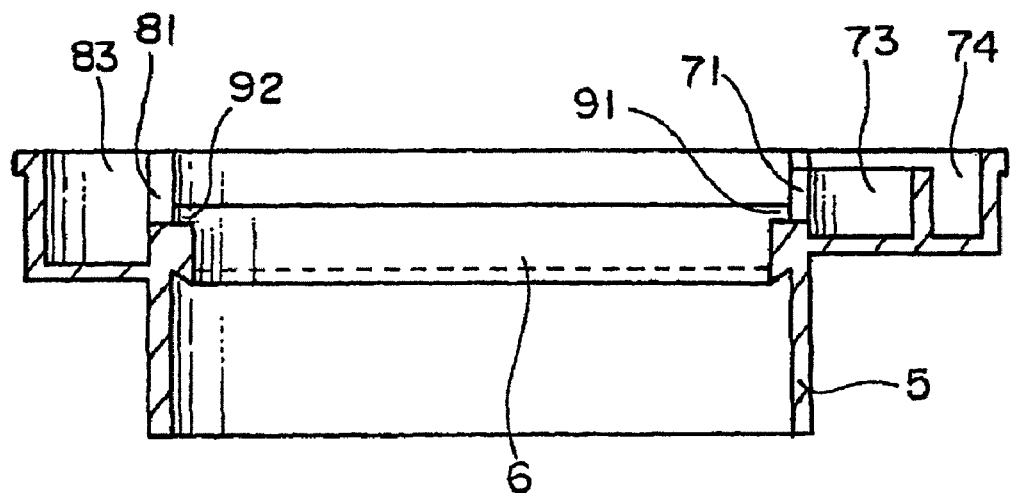
FIG. 14 is a sectional view along section line II-II of FIG. 13.
Figure 15:
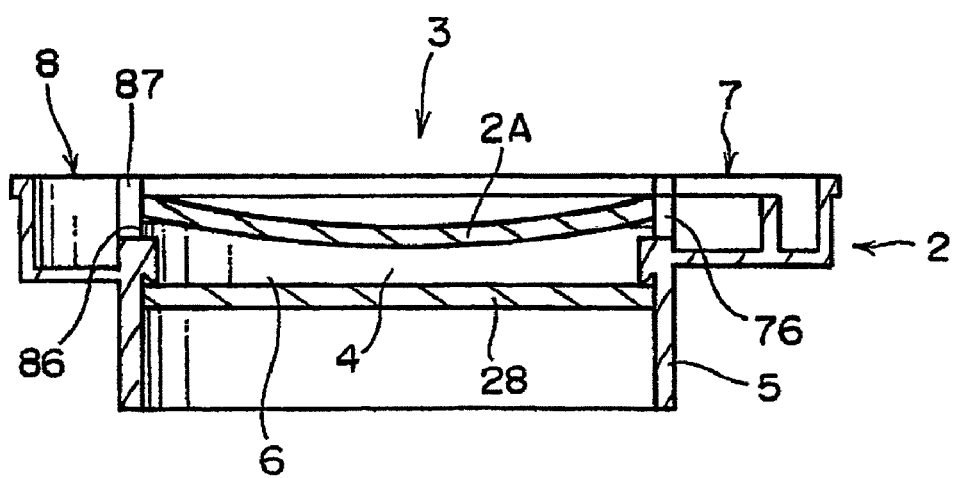
FIG. 15 is a sectional view of the gasket of FIG. 13 equipped with molds.
Figure 16:
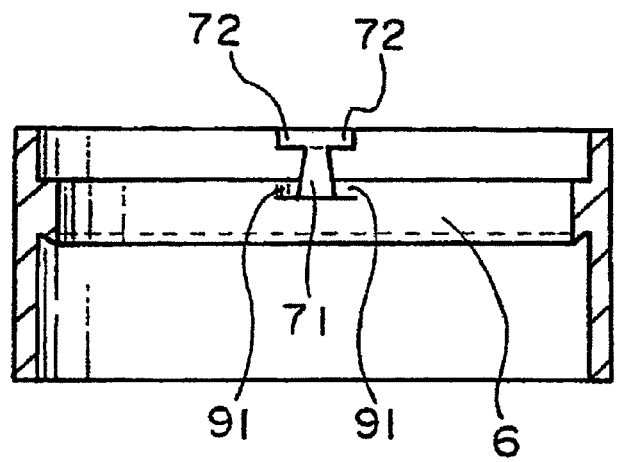
FIG. 16 is a sectional view along section line III-III of FIG. 13.

FIG. 13 is a plane view of the gasket for molding plastic lenses relating to the third example of the third aspect of the present invention. FIG. 14 is a sectional view along section line II-II of FIG. 13. FIG. 15 is a sectional view showing a state where the gasket shown in FIGS. 13 and 14 is equipped with a lens master mold. FIG. 16 is a section view along section line III-III in FIG. 13.

The third example is an example in which support member 6 is provided in belt-shaped form around the inner wall surface of cylindrical member 5. The other configurations are identical to those of the first example. Support member 6 is comprised of a belt-shaped protrusion positioned around the inner wall surface of cylindrical member 5. The upper and lower surfaces of support member 6 contact the rim portion of the molding surface of first mold 2A and the rim portion of second mold 2B. The support member, the molding surface of the first mold, and the molding surface of the second mold form a cavity.

The support member desirably contacts the rim portion of the molding surface of the first mold and the rim portion of the molding surface of the second mold at inner edge angular portions on the upper and lower surfaces of the support member. It is desirable that the shapes of the upper and lower surfaces of the support member are suitably determined to conform to the shape of the rim portions of the molding surfaces of the molds. In the present example, the molding surface of the first mold is downwardly convex and the molding surface of the second mold is upwardly concave. The angle of incline of the upper surface of the support member is smaller (shown as being horizontal in FIG. 15) than that of the rim portion of the molding surface of the first mold, and the angle of incline of the lower surface of the support member is greater than that of the rim portion of the molding surface of the second mold. Thus, the molding surfaces of the molds are brought into contact with the inner edge angular portions of the support member.

The height or position of the upper surface of the support member and that of the lower surface are identical all the way around. The height or position of the upper surface of the support member is higher than the bottom of the casting groove and discharge groove, and the height or position of the lower surface of the support member is lower than the bottom of the casting groove and discharge groove. Such a configuration ensures that the depth of the casting groove and discharge groove reaches but does not exceed the cavity.

In vicinity 91 of the casting groove opening on the cavity side and vicinity 92 of the discharge groove opening on the cavity side, the angle of the support member is eliminated and smooth, curved surfaces are formed so that the opening gradually widens. This is desirable to facilitate the flow of monomer in and out of the cavity.

Fourth Example

FIG. 17

Figure 17:
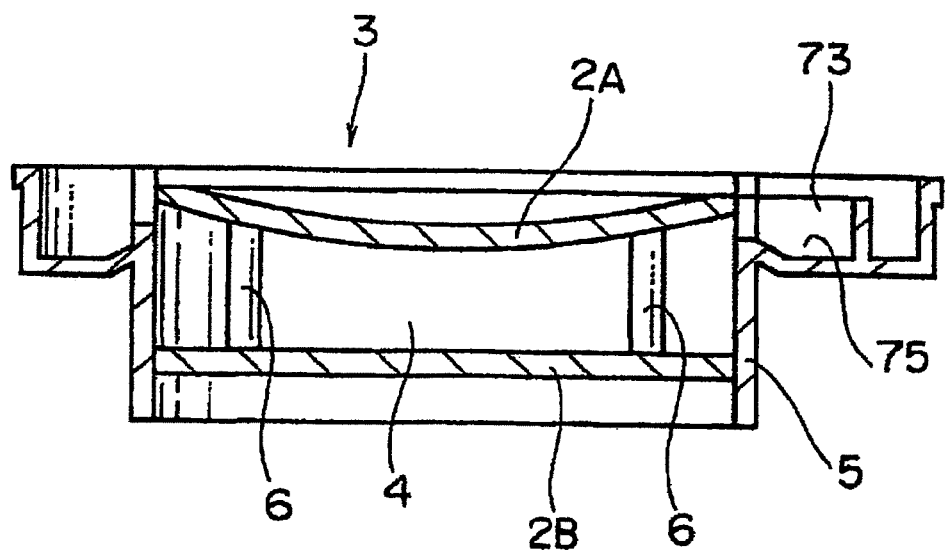
FIG. 17 is a sectional view of the gasket of another example according to the present invention equipped with molds.

FIG. 17 is a sectional view showing a state where the gasket for molding plastic lenses relating to the forth example of the present invention is equipped with a lens master mold.

The gasket shown in FIG. 17 is characterized in that constricted parts are provided on the connecting member between the casting member and the cylindrical member and on the connecting member between the discharge member and the cylindrical member. The other configurations are identical to that of the first example.

In the configuration shown in FIG. 17, the casting member and the discharge member are easily bent downward using the vicinity of the connecting member as a pivot. Thus, by bending downward the lens starting material polymerized within the casting inlet or discharge outlet together with the casting member or the discharge member, a polymerized portion within the casting inlet or discharge outlet can be readily severed from that within the cavity in the vicinity of the casting groove. This facilitates the operation of removing the gasket. The severing operation can be readily accomplished even when it is conducted in the course of polymerization.

Monomer Casting Jig

An example of the casting jig according to the third aspect of the present invention will be described below.

Figure 6:
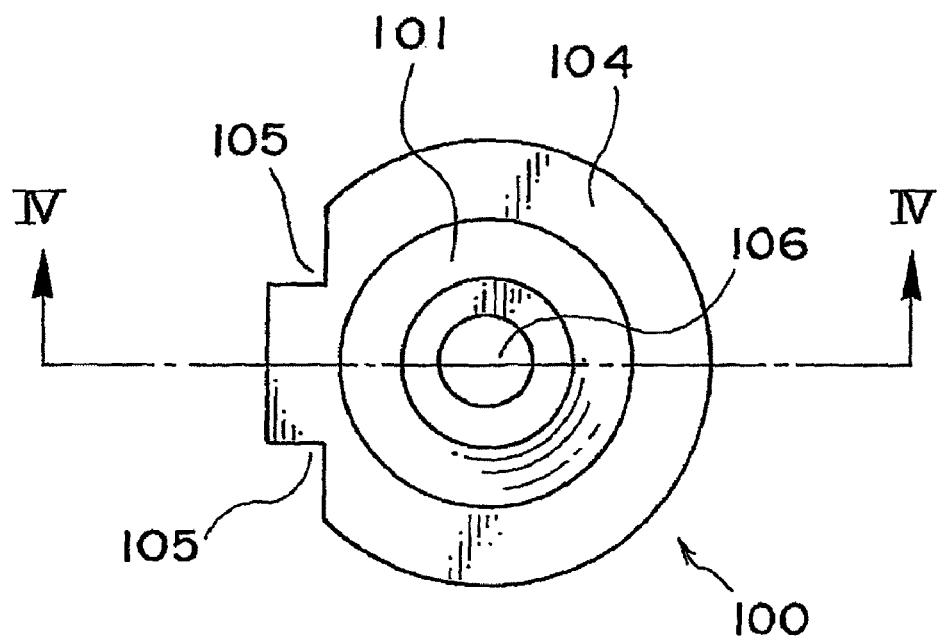
FIG. 6 is a plane view of an example of the casting jig according to the present invention.
Figure 7:
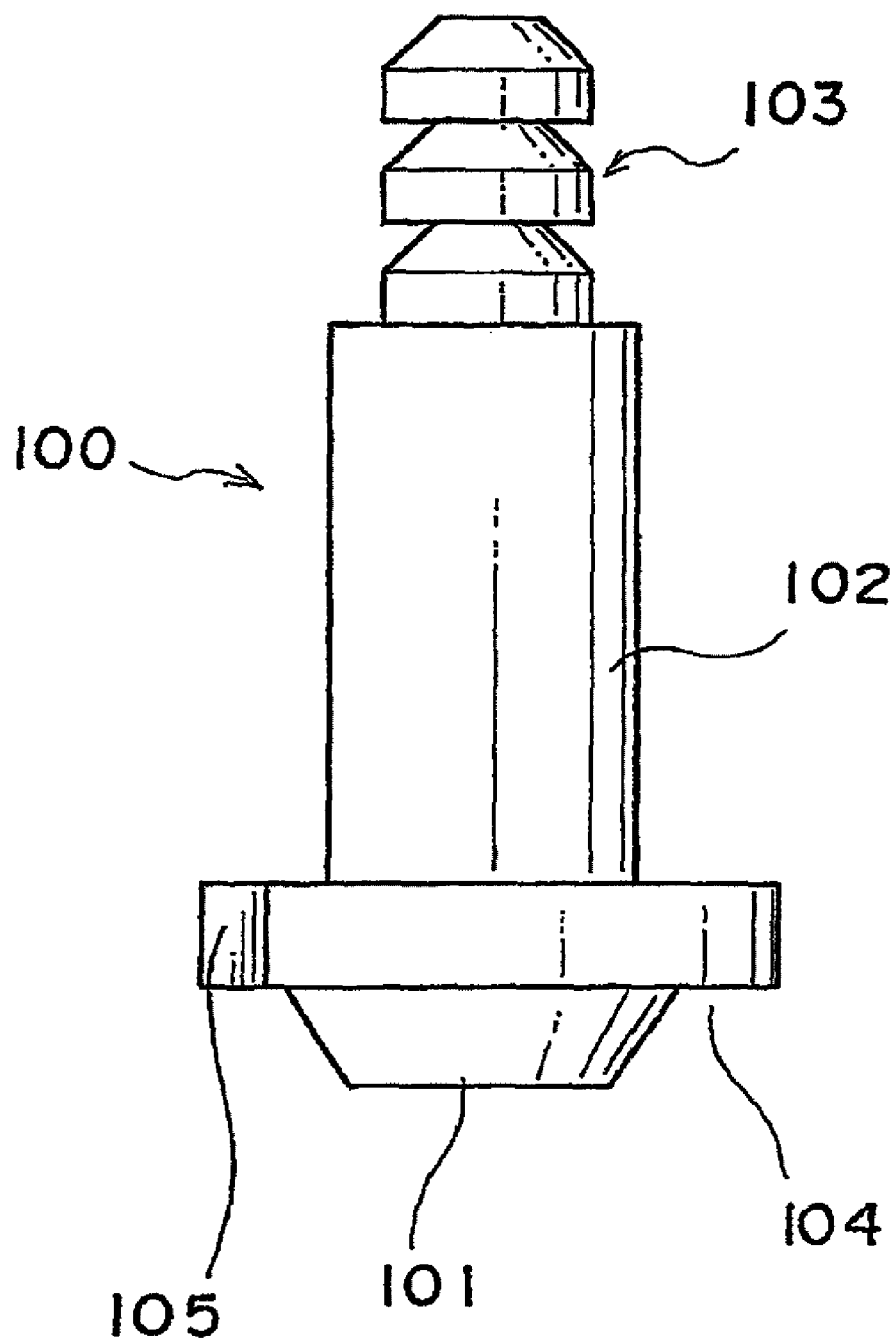
FIG. 7 is a lateral view of FIG. 6.
Figure 8:
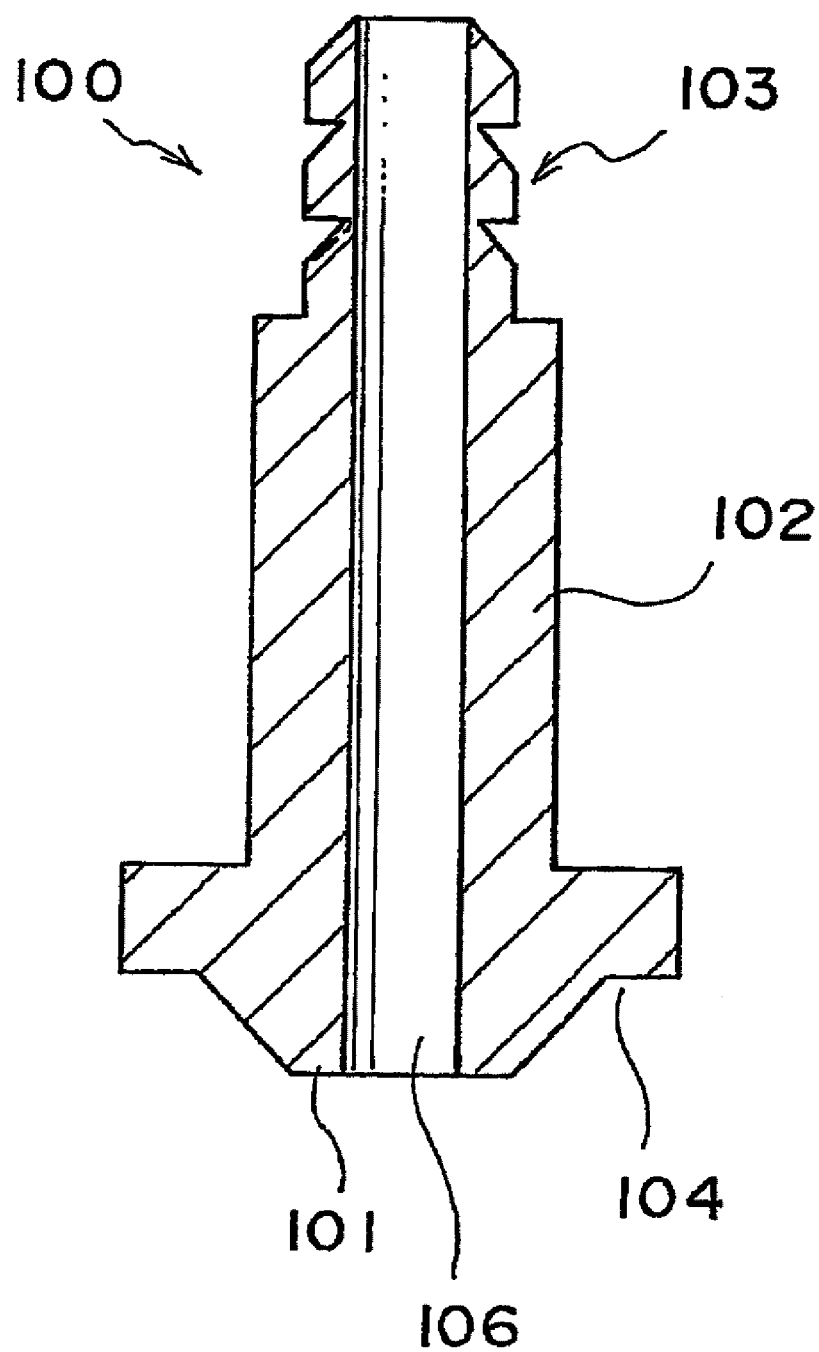
FIG. 8 is a sectional view along section line IV-IV of FIG. 6.

FIGS. 6 and 7 are the front view and lateral view, respectively, of a casting jig. FIG. 8 is a sectional view along section line IV-IV. Casting jig 100 is employed when casting a monomer into casting mold 3 employing gasket 1. As shown in FIG. 9, it is attached to the front end of tube 110 connected to a monomer supply source and employed.

The material of the casting jig is not specifically limited; examples are metals and resins.

Casting jig 100 has a cylindrical part 102 equipped with through-hole 106 permitting the passage of the starting material monomer. Cylindrical part 102 has nozzle member 101 on the front end thereof, and tube connecting member 103 on the rear end thereof. Casting inlet seal member 104 is provided around nozzle member 101.

Nozzle member 101 is pushed in casting inlet 73 of gasket 1 to conduct starting material monomer casting (FIG. 9). Therefore, it is appropriate for the outer diameter of nozzle member 101 to be smaller than the opening diameter of casting inlet 73 of the gasket.

Casting inlet seal member 104 has a flat portion. The configuration is such that when nozzle member 101 is aligned with the opening portion of casting inlet 73 of the gasket and pushed in, the flat portion contacts the opening of casting inlet 73, the upper end of casting groove both-side member 72, and the upper end of the rim of first mold 2A at a position corresponding to the casting groove, making it possible to block the opening of the casting member (FIG. 9).

Fitting members 105 comprised of notches are provided in two spots within casting inlet seal member 104 so that they fit together with the step portion between the upper end of casting groove both-side member 72 of gasket 1 mentioned above and the upper end of adjacent cylindrical member 5.

Fitting members 105 are desirably provided to facilitate positioning of the casting jig and permit reliable sealing of the opening.

In casting jig 100 shown in FIGS. 6 to 8, the front end of nozzle member 101 protrudes from casting inlet seal member 104. Having nozzle member 101 protruding from the casting inlet seal member affords the advantage of facilitating positioning of the casting jig. Providing a taper on the front end of nozzle member 101 is desirable to further facilitate positioning.

Figure 10:
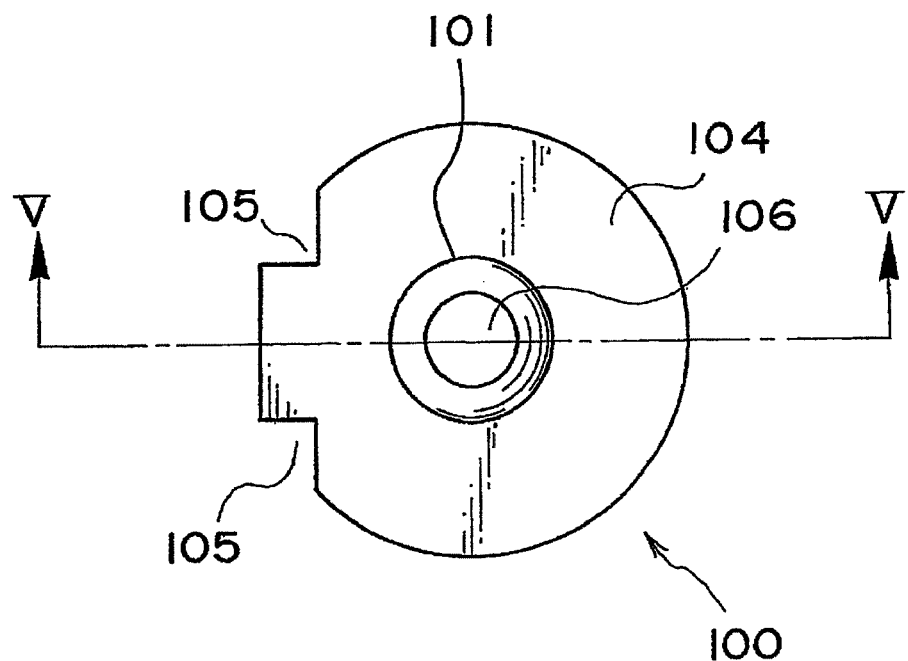
FIG. 10 is a plane view showing another example of the casting jig according to the present invention.
Figure 11:
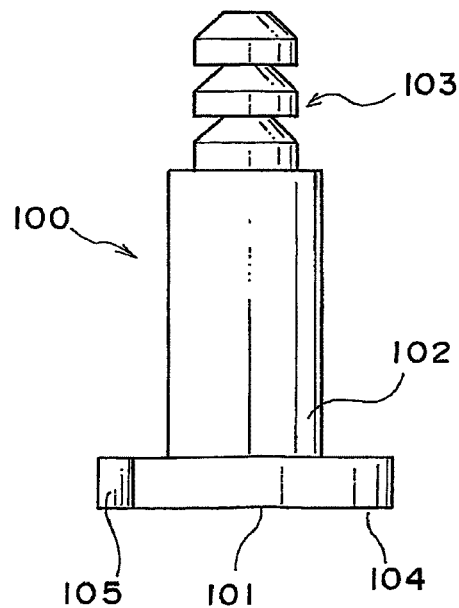
FIG. 11 is a lateral view of FIG. 9.
Figure 12:
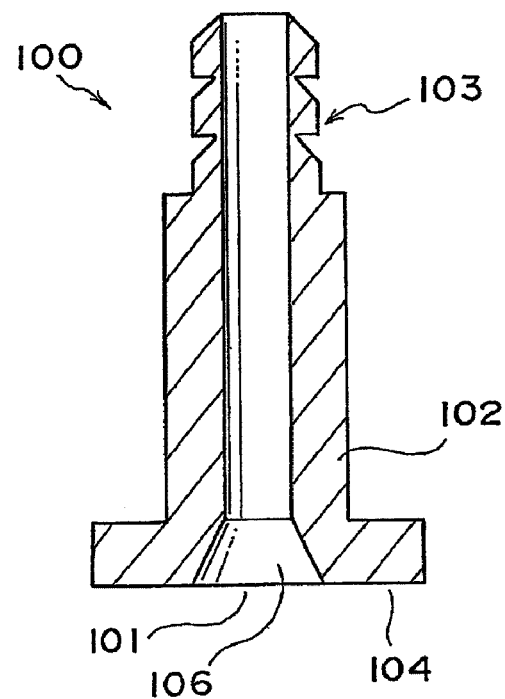
FIG. 12 is a sectional view along section line V-V of FIG. 10.

However, it is not necessary that nozzle member 101 protrudes from casting inlet seal member 104. For example, in the modification example shown in FIGS. 10 to 12, a configuration in which there is no protrusion beyond casting inlet seal member 104 is also possible.

Tube connecting member 103 has an outer diameter that is slightly larger than the inner diameter of tube 110. Connecting member 103 is inserted into the hole in the front end of tube 110, and with the hole of tube 110 and through-hole 106 of the casting jig connected, the elasticity of tube 110 is used to connect tube 110 to casting jig 100.

The structure of connecting member 103 is not specifically limited so long as connection can be accomplished without leaking the monomer from the connecting member.

Although the material of tube 110 is not specifically limited, the use of a flexible and elastic resin is desirable from the viewpoints of securing the casting jig and the tube by means of the elasticity of the tube and permitting free movement of the casting jig.

Since the monomer sometimes cures within the tube, replaceable tubes are preferred.

The procedure for manufacturing a plastic lens using the gasket and casting jig of the above-described configurations will be described below.

First, second mold 2B is inserted from the lower opening in gasket 1 and pushed in until the upper rim side of second mold 2B contacts the lower portion of the gasket support member. Similarly, first mold 2A is inserted from the upper opening in the gasket and pushed in until the lower rim side of first mold 2A contacts the upper portion of the gasket support member. A monomer is then cast into casting mold 3 thus configured. The monomer that is cast is not specifically limited, but high-viscosity monomer is particularly suited. Below, the case where a starting material comprised of the above-described isocyanate terminal prepolymer having intramolecular urethane bonds and the above-described aromatic diamine is employed as a monomer shall be given.

Since this starting material monomer has a rapid initial polymerization reaction rate, it must be cast into the casting mold immediately after mixing. A reaction injection molding machine, RIM machine, such as that shown in FIG. 18, for example, is employed for mixing. Tube 110 is attached to the nozzle of the mixing portion of the RIM machine and the front end of the tube is connected to casting jig 100.

Casting mold 3 is tilted so that the casting inlet is toward the bottom, nozzle member 101 of casting jig 100 is aligned with casting inlet 73 and pushed in, and casting is begun.

Starting material monomer M passes from the mixing portion of the RIM machine through tube 110, arriving at casting jig 100. It exits through nozzle 101 of casting jig 100, passing through casting hole 76 of gasket casting inlet 73 and entering cavity 4. The interface of the starting material monomer that is cast into cavity 4 is gradually forced upward while pushing the air in cavity 4 upward and discharging it through the discharge hole (FIG. 9(a)). The starting material monomer M eventually reaches the top of cavity 4, passes through discharge hole 86, and begins to accumulate in discharge outlet 83 (FIG. 9(b)). As this accumulation begins, casting is stopped and casting mold 3 is positioned horizontally.

When starting material monomer M overflows from casting inlet 73 during casting, it collects in the groove of cast receiving member 74, tending not to spill downward. A configuration in which the upper end of the wall portion of cast receiving member 74 is higher than the upper end of the wall portion of casting inlet 73 is particularly desirable because spilling tends not to occur even when the casting mold is tilted.

Further, since starting material monomer M flows through flow groove 87 to the upper surface side of the first mold once it has been filled in discharge outlet 83, it tends not to spill from casting mold 3.

Even when the starting material monomer that has flowed to the upper surface side of the first mold flows toward the casting member, it stops there when casting inlet seal member 104 of the casting jig and the upper end of casting groove both-side member 72 have been properly fit together. Even when they have not been fit together, the monomer flows into cast receiving member 74 and tends not to spill from casting mold 3.

Casting mold 3 that has been filled with starting material monomer M is placed within an electric furnace for a prescribed period to complete curing and remove internal stress. It is then removed from the electric furnace, the casting mold is removed, and the lens is finished.

Despite of high-viscosity starting material monomers with a high initial polymerization rate, in the lens thus obtained, air tends not to be involved by casting from below.

EXAMPLES

The present invention will be described in greater detail below through Examples.

Example 1

An example of the method of manufacturing transparent molded articles and plastic lenses of the present invention will be described in detail with FIG. 19.

To storage tank 20 equipped with temperature regulating means were charged 120 kg of component (A) and a stirring device was employed to stir the solution to render uniform the temperature in storage tank 20 at 70° C. The temperature was regulated by circulating diethylene glycol through the outer wall of storage tank 20 and regulating the temperature of diethylene glycol by means of an external temperature regulating device. The liquid heating medium was not limited to diethylene glycol; for example, water can be employed. At the time, the viscosity of component (A) was about 1,000 CPS. Degassing was conducted with a vacuum pump while keeping component (A) warm. In this case, the vacuum generated in storage tank 20 was 0.6 Torr or less. Once degassing had been adequately concluded, nitrogen gas was used to generate positive pressure within storage tank 20. Mono pump 21 (made by Heishin Sobi K.K.) connected to storage tank 20 was used to feed component (A) to filter 22 and transfer it to buffer tank 23. The pump employed has a good ability to transfer highly viscous liquids. Filter 22 is comprised of a filter element and a surrounding container. The outer wall of the filter container is equipped with a mechanism for circulating a liquid to maintain the temperature. The container was also connected to a temperature regulating device maintaining the temperature at 70° C. as storage tank 20 mentioned above. AB2FX7EH4 made by Japan Pall Corporation with a total length of 20 inches and a mesh size of 0.45 micron was employed. The filter member of the filter element was Teflon tetrafluoride (PTFE). The material constituting the container surrounding the filter member was polypropylene (PP).

Pressure sensors (not shown) were mounted upstream and downstream from filter 22, the pressure (pressure differential) exerted on the filter was measured, and, based on this information, the pump was regulated and discharge was conducted. Filtration was conducted so that the pressure was constantly less than or equal to the particular pressure differential resistance level of the filter of 0.45 MPa. The maximum pressure differential level reached in this case was 0.20 MPa. The filtration rate was 1.3 kg/min, and filtration required about 90 minutes. The filtered component (A) thus obtained was transferred to buffer tank 23, thoroughly degassed (where the vacuum achieved was 0.6 Torr), and then transferred to a RIM machine. Buffer tank 23 was kept warm at 70° C. and stirring was continued during degassing to keep component (A) uniform. Component (A) was transferred from buffer tank 23 to the RIM machine by increasing the pressure in buffer tank 23 to 0.2 MPa with nitrogen gas and generating a reduced pressure of 0.6 Torr in material tank 11A. Component (A) thus obtained was kept warm at a temperature of 50° C. in material tank 11A of the molding machine. Component (B) was filled in storage tank 25 into which a temperature regulating means was equipped, and the solution was stirred with a stirring device to render the temperature of the solution within storage tank 25 uniform at 20° C. The temperature was regulated by circulating diethylene glycol through the outer wall of storage tank 25 and using an external temperature regulating device to regulate the temperature of diethylene glycol. The viscosity of component (B) at the time was from 150 to 160 CPS. A vacuum pump was used to degass component (B) while keeping it warm. The degree of vacuum achieved in storage tank 25 was 0.6 Torr or less. After thoroughly degassing, positive pressure was generated within storage tank 25 with nitrogen gas to feed them to filter 26 and transfer to buffer tank 24 by generating a pressure differential with buffer tank 24, which was at atmospheric pressure. The same filter element was employed as in filtration of component (A). However, since the viscosity of component (B) was low, the filtration area of filter 24 was smaller than that of filter 22.

The filtered component (B) thus obtained was further thoroughly degassed (at a vacuum reaching 0.6 Torr) in buffer tank 24 and transferred to a RIM machine by means of a pressure differential. Subsequently, component (A) and component (B) that was at room temperature were uniformly and rapidly stirred for a short period in the mixing portion of the molding machine and continuously discharged from a discharge outlet. The mixture that was discharged was cast into a glass mold for molding lenses, heat polymerization was conducted for 15 hours at 120° C., and a plastic lens was obtained. It is also possible to provide a filter of larger mesh size (for example, 10 microns) than filter 22 between pump 21 and filter 22 mentioned above. In that case, large foreign matter is removed by the additional filter, permitting reduction of the load on filter 22.

Component (A) employed here was isocyanate terminal prepolymer with an isocyanate group content of 13 percent comprised of polytetramethylene glycol with an average molecular weight of 400 and 4,4'-methylenebis(cyclohexyl isocyanate), and component (B) employed was a mixture of 3,5-diethyl-2,4-toluene diamine and 3,5-diethyl-2,6-toluene diamine.

Further, monobutoxyethyl acid phosphate and di(butoxyethyl)acid phosphate were added as mold release agents in the present example. These mold release agents were uniformly dissolved in component (A) in advance in storage tank 20 prior to filtration.

The lenses obtained were visually observed under fluorescent lighting in a darkroom, revealing the absence of fogging, haze and foreign matter causing scattering due to microcrystals. They had extremely good transparency.

Steel balls 16 g in weight were dropped under their own weight from the FDA standard 1.27 m height to the center of an S-4.00 lens with a center thickness of 1.3 mm, but no damage was observed. An identical ball dropping test was conducted with 1 kg steel balls, but no damage was observed.

Comparative Example 1

Visual examination of transparent molded articles, obtained from the same materials and under the same polymerization conditions as set forth above but without conducting precision filtration with filter 22, revealed foreign matter in the form of precipitated nontransparent substances and the like. Haze was generated, and transparency was poor. When the 1 kg ball dropping test as mentioned above was conducted, cracking was observed, particularly in lenses with considerable hazing and foreign matter. These lenses thus had poor impact resistance.

Example 2

With the exception that temperature regulation was conducted in storage tank 20, buffer tank 23, and filter 22 so that the solution temperature remained 60° C. in each, manufacturing was conducted in the same manner as in Example 1. The viscosity of component (A) kept warm at 60° C. in storage tank 20 was about 2,500 CPS. The filtration rate of component (A) was about 0.6 kg/min, with filtration requiring about 200 minutes.

The lenses obtained were visually observed under fluorescent lighting in a darkroom, revealing the absence of fogging, haze and foreign matter causing scattering due to microcrystals. They had extremely good transparency.

Steel balls 16 g in weight were dropped under their own weight from the FDA standard 1.27 m height to the center of an S-4.00 lens with a center thickness of 1.3 mm, but no damage was observed. An identical ball dropping test was conducted with 1 kg steel balls, but no damage was observed.

The plastic lenses obtained in Examples and Comparative Examples below were evaluated according to the following evaluation methods.

Evaluation Methods (1) Temperature of the Casting Mold

This denotes the temperature at the center of the mold immediately prior to casting a mixed solution into the casting mold.

(2) Solution Temperatures During Mixing and after Packing

The temperature of component B immediately prior to mixing is lower than that of component A. Therefore, although the temperature momentarily drops when mixing, the temperature is thought to rise quickly due to the heat of the polymerization reaction. In the case of the present Example, after mixing component B at room temperature (25° C.) and heated component A in a RIM machine and measuring the temperature of the mixed solution exiting from the discharge outlet immediately thereafter, the temperature of the mixed solution was found to be about 55° C. when the temperature of component A just before mixing was about 50° C.

The temperature of the solution as it exited the discharge outlet and was cast into the casting mold to fill the same was also continuously raised due to reaction heat. Measurement of the transition of the solution temperature after exiting the discharge outlet revealed a temperature increase of about 20° C. 20 seconds later, reaching a maximum peak (about 100° C.) about two minutes later, and the gradually dropping to about 70 to 80° C. five minutes later.

(3) Bubble Generation

The exteriors of manufactured plastic lens products were examined. A conforming article rate of 70 percent or more was denoted as A, a conforming article rate of 50 percent or more as B, a conforming article rate of 30 percent or more as C, and less than 30 percent as D. Here, the term "conforming article" is used to mean that absolutely no bubbles were observed in the plastic lens manufactured, or that some bubbling was observed that could not be determined at the visual inspection level. When multiple bubbles were generated, the determination was made based on the largest bubble. Those with bubbles that were clearly generated by failed contact of the jig during casting were not evaluated.

(4) Optical Defects

The presence or absence of appearance flaws and striae were determined by zircon projection of manufactured plastic lenses. The case where 80 percent or more of the product passed the zircon projection product examination was denoted as A, the case where 60 percent or more passed as B, and the case where less than 60 percent passed as C. Here, the term "the product passed" is used to mean that no appearance flaws or striae were generated within a 30 mm radius of the geometric intermediate center of the lens.

(5) Appearance Flaws

The term "appearance flaws" is used to mean a state where a pattern is generated on the lens surface, like a flow mark due to casting of the mixed solution of components (A) and (B) above into the casting mold.

(6) Striae

The term "striae" is used to mean a mark due to temperature nonuniformity or polymerization nonuniformity during casting of the mixed solution of components (A) and (B) into the casting mold. Striae are generally known to appear not just during casting, but also due to thermal history during polymerization.

| Conditions under which evaluation samples were manufactured | |
|---|---|
| Discharge rate of RIM machine | 200 to 400 g/min |
| Average molecular weight of component A | about 600 to 700 |
| Mixing ratio of components A and B | 4:1 |
| Temperature of solution prior to mixing of each component | |
| Component A | about 50° C. |
| Component B room temperature, | about 25° C. |
| Time required to fill cavity | about 20 seconds |
| Lenses manufactured | |
| Center thickness = | about 7 mm |
| Diameter = | 76 mm |
| Weight of lenses manufactured | about 40 g |
| Tube exchange cycle | 3 min |

Example 3

Component (A)

To 100 weight parts of isocyanate terminal prepolymer with an isocyanate group content of 13 percent comprised of polytetramethylene glycol with an average molecular weight of 400 and 4,4'-methylenebis(cyclohexyl isocyanate) were added in advance 0.024 weight part of monobutoxyethyl acid phosphate and 0.036 weight part of di(butoxyethyl)acid phosphate, and the mixture was uniformly melted and degassed.

Component (B)

A 25.5 weight part quantity of a mixture of 3,5-diethyl-2,4-toluene diamine and 3,5-diethyl-2,6-toluene diamine was employed as component (B).

The temperature of the solution immediately after mixing components (A) and (B) was made 55° C., the temperature just prior to casting into the casting mold was made 70° C., the angle of incline of the casting mold was made 30 degrees, a tube equipped with jig was connected to the discharge outlet of the RIM machine, and the mixed solution of components (A) and (B) was cast through the casting inlet via the jig.

When casting had been completed, the casting mold was left undisturbed for 10 minutes at room temperature. Subsequently, also at room temperature, polymerized portions within the casting inlet and discharge outlet were bent together with the casting inlet and discharge outlet of the gasket, severing them in the vicinity of the casting hole and discharge hole. The casting mold that had been subjected to this severing operation was placed in an electric furnace preheated to 120°C. within 15 minutes after the completion of casting, where heat polymerization was conducted for 15 hours. Subsequently, the casting mold was removed from the electric furnace, the gasket was removed, the first and second molds were removed, and the plastic lens molded article was obtained.

The plastic lens obtained was then washed. Subsequently, the appearance of bubbles and optical defects were evaluated by the above-described evaluation methods. The results are given in Table 1.

Example 4

With the exception that the same components (A) and (B) as in Example 1 were employed and the casting mold was perpendicularly positioned, the same operations were conducted as in Example 3. Table 1 gives the results of evaluation of the appearance of bubbles and optical defects of the plastic lenses thus obtained.

Example 5

The same components (A) and (B) as in Example 3 were employed. With the exception that the casting mold was heated to a pre-casting temperature of 40°C., the same operations were conducted as in Example 3. Table 1 gives the results of evaluation of the appearance of bubbles and optical defects of the plastic lenses thus obtained. When the casting mold was not heated, bubble defects attributed to wettability of the gasket and mold were observed.

Comparative Example 2

The same components (A) and (B) as in Example 3 were employed. With the exception that the casting mold was positioned at an angle of 0 degree, the same operations were conducted as in Example 3. Evaluation of the appearance of bubbles and optical defects of the plastic lenses thus obtained revealed the occurrence of numerous appearance flaws attributed to flow marks. Further, air within the casting mold was involved into the mixed solution during casting of the mixed solution, resulting in numerous bubble defects.

Comparative Example 3

The same components (A) and (B) as in Example 5 were employed. With the exception that casting was conducted from above the casting mold, the same operations were conducted as in Example 5. During casting, the discharge hole was blocked. Casting was conducted through the casting inlet while maintaining an angle of incline of 30 degrees, at which the casting inlet was at its highest point. At that time, the front end of the jig did not seal against the casting inlet, leaving a gap through which the mixed solution flowed. An examination of bubbling in the plastic lenses thus obtained revealed the occurrence of numerous bubble defects due to bubbles involved during casting.

TABLE 1

| | Temperature of casting mold immediately prior to casting (° C.) | Angle at which casting mold was positioned | Bubbles | Optical defects |
|---|---|---|---|---|
| Example 3 | 70 | 30° | A | A |
| Example 4 | 70 | 90° | A | A |
| Example 5 | 40 | 30° | B | A |
| Comp. Ex. 2 | 40 | 0° | D | D |
| Comp. Ex. 3 | 40 | 30° (Casting was conducted from above) | D | D |

INDUSTRIAL APPLICABILITY

The manufacturing method of the first aspect of the present invention provides a method of manufacturing optical members having good optical and mechanical characteristics by removing not just foreign matter and debris from component (A), but also minute foreign matter tending to compromise the transparency, optical properties, and mechanical strength of molded articles.

The manufacturing method of the second aspect of the present invention provides a method of manufacturing plastic lenses, in which optical defects and bubble defects are avoided, from an isocyanate terminal prepolymer component (A) that is a reaction product of an aliphatic diisocyanate having a intramolecular cyclic structure and a diol having an average molecular weight of 300 to 2,500, and an aromatic diamine component (B).

A method of manufacturing plastic lenses from which the gaskets are readily removed following molding is also provided.

Still further, as set forth above, the gasket for molding plastic lenses of the third aspect and the casting jig of the third aspect of the present invention are suited to the cast molding of high viscosity monomers and the starting material monomers for reaction injection molding.

Since a casting hole and discharge hole can be formed without forming holes in the gasket in the third aspect of the present invention, gasket manufacturing is facilitated and manufacturing costs are reduced.

Further, a monomer overflowing from the casting inlet flows into a cast receiving member and a monomer overflowing from the discharge outlet flows onto the upper surface side of the upper mold gasket, thereby preventing the monomer from spilling from the gasket.

Further, making the bottom of the casting inlet round makes it difficult for bubbles to remain in the casting inlet during casting.

The casting jig of the third aspect of the present invention permits ready sealing of the casting member opening of the gasket of the present invention.

What is claimed is:
1. A method of manufacturing an eyewear lens, the method comprising:
heating a component (A) to a viscosity of 5000 CPS or less,
passing the heated component (A) through a filter under pressure, thereby removing foreign matter comprised in the component (A), subsequently degassing the filtered component (A) under a reduced pressure, mixing the degassed component (A) and a component (B), immediately after the mixing, casting the mixture into a casting mold, thereby obtaining the eyewear lens, and leaving the casting mold in a low-temperature atmosphere, thereby polymerizing said mixture in the casting mold by a self-heating of said mixture, and leaving the casting mold in a high-temperature atmosphere for further polymerization of said mixture after a temperature of the self-heating reaches a maximum peak, wherein the component (A) is an isocyanate terminal prepolymer in the form of a reaction product of an aliphatic diisocyanate having an intramolecular cyclic structure and a diol having an average molecular weight of 300 to 2,500, and wherein the component (B) is one or more aromatic diamines of the formula (I), wherein in the formula (I), $R_1$, $R_2$ and $R_3$ are each independently a methyl, ethyl or thiomethyl group:

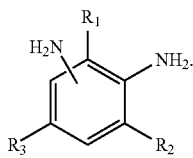

Formula (I)

2. The method of manufacturing according to claim 1, wherein the aliphatic diisocyanate is an alicyclic diisocyanate.

3. The method of manufacturing according to claim 2, wherein the alicyclic diisocyanate is at least one compound selected from the group consisting of 4,4'-methylenebis(cyclohexyl isocyanate), isophorone diisocyanate, 1,3-bis(isocyanate methyl)cyclohexane, and norbornene diisocyanate.

4. The method of manufacturing according to claim 1, wherein the diol is a polyether diol or polyester diol.

5. The method of manufacturing according to claim 1, wherein the isocyanate group content of the component (A) is from 10 to 20 weight percent.

6. The method of manufacturing according to claim 1, wherein said mixing and casting into the casting mold are carried out in a reaction injection molding machine, and said removal of the foreign matter is carried out prior to feeding to the reaction injection molding machine.

7. The method of manufacturing according to claim 1, wherein said filter has an absolute filtration precision of from 0.05 to 10 μm.

8. The method of manufacturing according to claim 1, wherein a filter member of said filter is one selected from the group consisting of polypropylene (PP), polyvinylidene fluoride (PVDF), polyphenylene sulfide (PPS), cellulose, 304 stainless steel, and 316 stainless steel.

9. The method of manufacturing according to claim 1, wherein said component B is filtered and degassed prior to the mixing.

10. The method of manufacturing according to claim 9, wherein said component B is filtered with a filter having an absolute filtration precision of from 0.05 to 10 μm.

* * * * *

UNITED STATES PATENT AND TRADEMARK OFFICE
CERTIFICATE OF CORRECTION

PATENT NO. : 8,377,345 B2
APPLICATION NO. : 12/694673
DATED : February 19, 2013
INVENTOR(S) : Masanori Kadota et al.

Page 1 of 1

It is certified that error appears in the above-identified patent and that said Letters Patent is hereby corrected as shown below:

On the title page, Item (54) and in the specification, column 1, the title should read:

-- METHOD OF MANUFACTURING OPTICAL MEMBER, METHOD OF MANUFACTURING PLASTIC LENS, GASKET FOR MOLDING PLASTIC LENS, AND JIG FOR CASTING MONOMER --

Signed and Sealed this
Twenty-first Day of May, 2013

Teresa Stanek Rea
*Acting Director of the United States Patent and Trademark Office*